(12) United States Patent
Kent et al.

(10) Patent No.: US 9,779,901 B2
(45) Date of Patent: Oct. 3, 2017

(54) HIGH TEMPERATURE MATERIAL COMPOSITIONS FOR HIGH TEMPERATURE THERMAL CUTOFF DEVICES

(71) Applicant: Therm-O-Disc, Incorporated, Mansfield, OH (US)

(72) Inventors: Perry Kent, Mansfield, OH (US); Truong Nguyen, Wooster, OH (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 212 days.

(21) Appl. No.: 14/593,768

(22) Filed: Jan. 9, 2015

(65) Prior Publication Data
US 2015/0162153 A1    Jun. 11, 2015

Related U.S. Application Data

(63) Continuation of application No. 13/352,181, filed on Jan. 17, 2012, now Pat. No. 8,961,832, which is a
(Continued)

(51) Int. Cl.
*H01B 1/12* (2006.01)
*H01H 37/76* (2006.01)
(Continued)

(52) U.S. Cl.
CPC .............. *H01H 37/765* (2013.01); *H01B 1/12* (2013.01); *H01H 69/02* (2013.01);
(Continued)

(58) Field of Classification Search
CPC ....... H01H 2037/762; H01H 2037/768; H01H 2223/008; H01H 2235/004;
(Continued)

(56) References Cited

U.S. PATENT DOCUMENTS 3,281,559 A   10/1966   Ebensteiner
3,519,972 A    7/1970   Merrill
(Continued)

FOREIGN PATENT DOCUMENTS

CN    2385431 Y     6/2000
CN   101685733 A    3/2010
(Continued)

OTHER PUBLICATIONS

Parker, Earl E., Modern Plastics, 36(10), pp. 135-136, 138, 208 (1959) (Abstract Only).
(Continued)

*Primary Examiner* — Mark Kopec
*Assistant Examiner* — Jaison Thomas
(74) *Attorney, Agent, or Firm* — Harness, Dickey & Pierce, P.L.C.

(57) ABSTRACT

The present disclosure provides a high-temperature thermal pellet composition that maintains structural rigidity up to a transition temperature of about 240° C. The composition comprises at least one organic compound (e.g., triptycene or 1-aminoanthroquinone). The pellet can be disposed in a housing of a thermally-actuated, current cutoff device, such as a high-temperature thermal cutoff device (HTTCO). Also provided are material systems, which include the pellet composition and a high-temperature seal that provides substantial sealing up to at least the transition temperature. Methods of making such high-temperature pellet compositions and incorporating them into a thermally-actuated, current cutoff device are also provided.

17 Claims, 1 Drawing Sheet

Related U.S. Application Data continuation of application No. 12/512,369, filed on Jul. 30, 2009, now abandoned.

(60) Provisional application No. 61/086,330, filed on Aug. 5, 2008.

(51) Int. Cl.
  *H01H 85/055* (2006.01)
  *H01H 69/02* (2006.01)
  *H02H 5/04* (2006.01)

(52) U.S. Cl.
  CPC .......... *H01H 85/055* (2013.01); *H02H 5/047* (2013.01); *H01H 2037/762* (2013.01); *H01H 2037/768* (2013.01); *H01H 2223/008* (2013.01); *H01H 2235/004* (2013.01); *H01H 2235/01* (2013.01); *Y10T 29/49105* (2015.01); *Y10T 29/49107* (2015.01)

(58) Field of Classification Search
  CPC .. H01H 2235/01; H01H 37/765; H01H 69/02; H01H 85/055; H02H 5/047; Y10T 29/49105; Y10T 29/49107; H01B 1/12
  See application file for complete search history.

(56) References Cited

U.S. PATENT DOCUMENTS

| | | |
|---|---|---|
| 3,571,777 A | 3/1971 | Tully |
| 3,692,921 A | 9/1972 | Yonkers |
| 3,711,428 A | 1/1973 | Aycock et al. |
| 3,727,164 A | 4/1973 | Cartier et al. |
| 3,745,507 A | 7/1973 | Ishida et al. |
| 3,781,737 A | 12/1973 | Henry |
| 3,793,716 A | 2/1974 | Smith-Johannsen |
| 3,883,837 A | 5/1975 | Wolfe et al. |
| 3,898,602 A | 8/1975 | Schurter |
| 3,924,218 A | 12/1975 | Plasko |
| 3,930,215 A | 12/1975 | Senor |
| 3,951,582 A | 4/1976 | Holub et al. |
| 3,974,105 A | 8/1976 | Sato et al. |
| 4,001,754 A | 1/1977 | Plasko |
| 4,006,443 A | 2/1977 | Kouchich et al. |
| 4,023,072 A | 5/1977 | Plasko |
| 4,031,497 A | 6/1977 | Ozawa |
| 4,065,741 A | 12/1977 | Sakamoto et al. |
| 4,068,204 A | 1/1978 | Iwanari et al. |
| 4,075,595 A | 2/1978 | Plasko |
| 4,075,596 A | 2/1978 | Plasko |
| 4,084,147 A | 4/1978 | Mlyniec et al. |
| 4,142,418 A | 3/1979 | Lagher |
| 4,184,139 A | 1/1980 | Hara |
| 4,186,366 A | 1/1980 | McVey |
| 4,189,697 A | 2/1980 | Hara |
| 4,197,634 A | 4/1980 | Plasko |
| 4,249,154 A | 2/1981 | Grable |
| 4,259,656 A | 3/1981 | Smith |
| 4,276,531 A | 6/1981 | Davis |
| 4,276,532 A | 6/1981 | Aoki |
| 4,281,308 A | 7/1981 | McVey |
| 4,281,309 A | 7/1981 | Olson |
| 4,310,469 A | 1/1982 | Crivello |
| 4,322,705 A | 3/1982 | Hara |
| 4,344,061 A | 8/1982 | Niwa |
| 4,373,556 A | 2/1983 | Bergh |
| 4,384,267 A | 5/1983 | Aoki |
| 4,480,247 A | 10/1984 | Hara |
| 4,514,718 A | 4/1985 | Birx |
| 4,529,957 A | 7/1985 | Hara |
| 4,630,023 A | 12/1986 | Gawron et al. |
| 4,675,641 A | 6/1987 | Hampton et al. |
| 4,757,423 A | 7/1988 | Franklin |
| 4,763,099 A | 8/1988 | Balderson |
| 4,763,228 A | 8/1988 | Su |
| 4,786,438 A | 11/1988 | Blackmore |
| 4,808,965 A | 2/1989 | Cenky |
| 4,821,010 A | 4/1989 | Plasko |
| 4,841,273 A | 6/1989 | Horton |
| 4,873,506 A | 10/1989 | Gurevich |
| 4,873,604 A | 10/1989 | Goldberg et al. |
| 4,878,038 A | 10/1989 | Tsai |
| 4,881,055 A | 11/1989 | Capp et al. |
| 4,933,658 A | 6/1990 | Gerhardt et al. |
| 4,968,962 A | 11/1990 | Hohider et al. |
| 5,003,283 A | 3/1991 | Cenky |
| 5,015,514 A | 5/1991 | Rinehart |
| 5,017,545 A | 5/1991 | Kanda et al. |
| 5,027,101 A | 6/1991 | Morrill, Jr. |
| 5,106,538 A | 4/1992 | Barma et al. |
| 5,106,540 A | 4/1992 | Barma et al. |
| 5,153,553 A | 10/1992 | Ruehl et al. |
| 5,171,774 A | 12/1992 | Ueno et al. |
| 5,173,593 A | 12/1992 | Ogino et al. |
| 5,212,261 A | 5/1993 | Stierman |
| 5,473,303 A | 12/1995 | Hohider |
| 5,530,417 A | 6/1996 | Hohider |
| 5,545,679 A | 8/1996 | Bollinger, Jr. et al. |
| 5,601,924 A | 2/1997 | Beane et al. |
| 5,663,702 A | 9/1997 | Shaw, Jr. et al. |
| 5,712,610 A | 1/1998 | Takeichi et al. |
| 5,750,277 A | 5/1998 | Vu et al. |
| 5,772,949 A | 6/1998 | Haider et al. |
| 5,777,540 A | 7/1998 | Dedert et al. |
| 5,808,538 A | 9/1998 | Nguyen |
| 5,816,493 A | 10/1998 | Pirkle |
| 5,825,277 A | 10/1998 | Bishop et al. |
| 5,837,164 A | 11/1998 | Zhao |
| 5,856,773 A | 1/1999 | Chandler et al. |
| 5,914,649 A | 6/1999 | Isono et al. |
| 5,929,741 A | 7/1999 | Nishimura et al. |
| 5,939,968 A | 8/1999 | Nguyen et al. |
| 5,963,121 A | 10/1999 | Stygar et al. |
| 5,985,182 A | 11/1999 | Zhao |
| 5,993,698 A | 11/1999 | Frentzel et al. |
| 6,059,997 A | 5/2000 | Hall |
| 6,133,547 A | 10/2000 | Maynard |
| 6,150,051 A | 11/2000 | Du Pasquier et al. |
| 6,157,528 A | 12/2000 | Anthony |
| 6,188,559 B1 | 2/2001 | Vincent et al. |
| 6,215,636 B1 | 4/2001 | Hellemans |
| 6,282,074 B1 | 8/2001 | Anthony |
| 6,300,859 B1 | 10/2001 | Myong et al. |
| 6,359,544 B1 | 3/2002 | Blok |
| 6,375,867 B1 | 4/2002 | Smith et al. |
| 6,388,553 B1 | 5/2002 | Shea et al. |
| 6,388,856 B1 | 5/2002 | Anthony |
| 6,396,384 B1 | 5/2002 | Blok et al. |
| 6,403,935 B2 | 6/2002 | Kochman et al. |
| 6,452,138 B1 | 9/2002 | Kochman et al. |
| 6,489,879 B1 | 12/2002 | Singh et al. |
| 6,515,570 B2 | 2/2003 | Kaltenborn et al. |
| 6,563,094 B2 | 5/2003 | Kochman et al. |
| 6,673,257 B1 | 1/2004 | Hudson |
| 6,713,733 B2 | 3/2004 | Kochman et al. |
| 6,787,606 B1 * | 9/2004 | Chen ............... C08L 63/00 359/265 |
| 6,806,806 B2 | 10/2004 | Anthony |
| 6,812,276 B2 | 11/2004 | Yeager |
| 6,878,782 B2 | 4/2005 | Merfeld et al. |
| 6,922,131 B2 | 7/2005 | Walsh et al. |
| 6,981,319 B2 | 1/2006 | Shrier |
| 7,154,369 B2 | 12/2006 | Dietz et al. |
| 7,205,035 B2 | 4/2007 | Merfeld |
| 7,235,192 B2 | 6/2007 | Yeager et al. |
| 7,250,477 B2 | 7/2007 | Guo et al. |
| 7,323,966 B2 | 1/2008 | Yoshikawa |
| 7,330,098 B2 | 2/2008 | Yoshikawa |
| 7,362,208 B2 | 4/2008 | Yoshikawa et al. |
| 7,439,844 B2 | 10/2008 | Hase et al. |
| 7,532,101 B2 | 5/2009 | Suzuki |
| 7,785,732 B2 | 8/2010 | Chang et al. |
| 7,981,977 B2 * | 7/2011 | Tendou ............... C08G 59/063 257/791 |

(56) References Cited

U.S. PATENT DOCUMENTS

| | | |
|---|---|---|
| 8,961,832 B2 | 2/2015 | Kent et al. |
| 9,171,654 B2 | 10/2015 | Hinrichs et al. |
| 2002/0196592 A1 | 12/2002 | Chen et al. |
| 2003/0112117 A1 | 6/2003 | Miyashita et al. |
| 2004/0191556 A1 | 9/2004 | Jardine |
| 2005/0088272 A1 | 4/2005 | Yoshikawa |
| 2005/0179516 A1 | 8/2005 | Yoshikawa |
| 2006/0204202 A1 | 9/2006 | Hanemann et al. |
| 2006/0208845 A1 | 9/2006 | Yoshikawa |
| 2006/0232372 A1 | 10/2006 | Yoshikawa |
| 2008/0006795 A1 | 1/2008 | Khatua et al. |
| 2010/0033295 A1 | 2/2010 | Kent et al. |
| 2012/0121795 A1 | 5/2012 | Kent et al. |
| 2013/0334471 A1 | 12/2013 | Hinrichs et al. |

FOREIGN PATENT DOCUMENTS

| | | |
|---|---|---|
| DE | 186526 C | 2/1904 |
| DE | 3422528 A1 | 12/1985 |
| EP | 1528586 A1 | 5/2005 |
| EP | 2151846 A2 | 2/2010 |
| EP | 2674956 A | 12/2013 |
| GB | 1255589 A | 12/1971 |
| JP | 10-177833 | 6/1998 |
| JP | 2002163966 A | 6/2002 |
| KR | 20020021065 A | 3/2002 |
| TW | 552604 B | 9/2003 |
| WO | 00/19773 A1 | 4/2000 |
| WO | 02/069671 A2 | 9/2002 |
| WO | 2004/109868 A1 | 12/2004 |

OTHER PUBLICATIONS

Aldrich Catalog, pp. 42, 114, 606, 1181 (1996).
Communication issued by the European Patent Office on Mar. 22, 2012 enclosing the Partial European Search Report dated Mar. 16, 2012 for related European Patent Application No. 09167298.0.
Communication issued by the European Patent Office on Jun. 19, 2012 enclosing the Extended European Search Report dated Jun. 12, 2012 for related European Patent Application No. 09167298.0.
Communication issued by the European Patent Office on Jul. 23, 2012 for related European Patent Application No. 09167298.0.
Response to Communication issued by the European Patent Office on Jul. 23, 2012 for European Patent Application No. 09167298.0 as filed on Jan. 18, 2013.
Communication issued by the European Patent Office on Mar. 7, 2013 for European Patent Application No. 09167298.0.
First Office Action issued by the Patent Office of the People's Republic of China on May 7, 2013 for Chinese Patent Application No. 200910211606.9 (Pub. No. CN 101685733), translation provided by Liu, Shen & Associates.
International Standard, IEC 60691, Third Ed. (Dec. 2002).
Wacker Silicones, HDK® N20, Pyrogenic Silica—Fumed Silica, Version 3.3, 2 pages (Apr. 15, 2005).
Dow Corning® Si Powder Resin Modifiers, Product Information, Plastics, Form No. 22-1745B-01, 4 pages (Oct. 19, 2011).
Wacker Silicones, HDK®—Pyrogenic Silica, 6180e, 12 pages (May 2010).
Wacker Silicones, Perfect Toners Hide a Secret: HDK®—Pyrogenic Silica, 6178e, 22 pages (Sep. 2007).
Extended European Search Report issued by the European Patent Office on Sep. 24, 2013 for European Patent Application No. 13172335.5 (not yet published).
Second Office Action issued by the Patent Office of the People's Republic of China on Feb. 8, 2014 for Chinese Patent Application No. 200910211606.9 (Pub. No. CN 101685733), translation provided by Liu, Shen & Associates.
Response to Extended European Search Report issued by the European Patent Office on Sep. 24, 2013 for European Patent Application No. 13172335.5 (Pub. No. EP 2674956), as filed on Jun. 18, 2014.
The Merck Index Online, https://www.rsc.org/Merck-Index/monograph/mono1500009925/triptycene?q=authorize (retrieved on Mar. 24, 2014).
Decision of Final Rejection of the Application issued by the Patent Office of the People's Republic of China on May 27, 2014 for Chinese Patent Application No. 200910211606.9 (Pub. No. CN 101685733).
Notification of Reexamination issued by the Patent Office of the People's Republic of China on Mar. 17, 2015 for related Chinese Patent Application No. 200910211606.9 (Pub. No. CN 101685733). Translation provided by Liu, Shen & Associates.
Communication and Annex issued by the European Patent Office on Jun. 21, 2016 for European Patent Application No. 13172335.5.
Communication issued by the European Patent Office on Nov. 18, 2016 for European Patent Application No. 13172335.5.
Communication issued by the European Patent Office on Aug. 4, 2015 for European Patent Application No. 13172335.5.
Response to Communication issued by the European Patent Office on Aug. 4, 2015 for European Patent Application No. 13172335.5, as filed on Feb. 15, 2016.
Response to Communication issued by the European Patent Office on Jun. 21, 2016 for European Patent Application No. 13172335.5, as filed on Nov. 30, 2016.

\* cited by examiner

HIGH TEMPERATURE MATERIAL COMPOSITIONS FOR HIGH TEMPERATURE THERMAL CUTOFF DEVICES

CROSS-REFERENCE TO RELATED APPLICATIONS

This application is a continuation of co-pending U.S. patent application Ser. No. 13/352,181 filed on Jan. 17, 2012, which is a continuation of U.S. patent application Ser. No. 12/512,369 filed on Jul. 30, 2009, which claims the benefit of U.S. Provisional Application No. 61/086,330, filed on Aug. 5, 2008. The entire disclosures of each of the above applications are incorporated herein by reference.

FIELD

The present disclosure relates to high temperature material compositions for electrical current interruption devices and more particularly to pellet compositions and materials for high-temperature electrical current interruption safety devices, or thermal cut-offs, that provide protection from over-temperature conditions.

BACKGROUND

The statements in this section merely provide background information related to the present disclosure and may not constitute prior art.

Temperatures of operation for appliances, electronics, motors and other electrical devices typically have an optimum range. The temperature range where damage can occur to system components or where the device becomes a potential safety hazard in the application or to the end-user serves as an important detection threshold. Various devices are capable of sensing such over-temperature thresholds. Certain devices which are capable of sensing over-temperature conditions and interrupting electrical current include electrical thermal fuses, which only operate in a narrow temperature range. For example, tin and lead alloys, indium and tin alloys, or other metal alloys which form a eutectic metal, are unsuitable for appliance, electronic, electrical and motor applications due to undesirably broad temperature response thresholds and/or detection temperatures that are outside the desired range of safety.

One type of device particularly suitable for over-temperature detection is an electrical current interruption safety device, known as a thermal cut-off (TCO), which is capable of temperature detection and simultaneous interruption of current, when necessary. Such TCO devices are typically installed in an electrical application between the current source and electrical components, such that the TCO is capable of interrupting the circuit continuity in the event of a potentially harmful or potentially dangerous over-temperature condition. TCOs are often designed to shut off the flow of electric current to the application in an irreversible manner, without the option of resetting the TCO current interrupting device. High temperature appliances and applications require the use of robust over-temperature detection devices with high-holding temperatures exceeding the operating temperatures and/or holding temperatures of conventional TCO designs. Thus, in various aspects, the present disclosure provides stable, reliable, and robust high-temperature TCO devices.

SUMMARY

This section provides a general summary of the disclosure, and is not a comprehensive disclosure of its full scope or all of its features.

In certain aspects, the present disclosure provides a high temperature thermally-actuated thermal cutoff device that comprises a housing and a high-temperature thermal pellet. The high-temperature thermal pellet comprises a single organic compound, which in certain aspects is an organic polycyclic aromatic hydrocarbon compound. The high-temperature thermal pellet is disposed in the housing and maintains its structural rigidity up to a transition temperature of greater than or equal to about 240° C. The high temperature thermally-actuated thermal cutoff device also comprises a high-temperature seal that creates a barrier that interacts with the high-temperature thermal pellet to substantially prevent escape of the single organic compound from the housing into an external environment up to the transition temperature.

In other aspects, the present disclosure provides a high-temperature thermally-actuated, current cutoff device that comprises a housing and a high-temperature pellet composition. The high-temperature pellet composition comprises 1-aminoanthroquinone. The high-temperature pellet composition is disposed in the housing and maintains its structural rigidity up to a transition temperature of about 240° C.

In yet other aspects, the present disclosure provides a method of making a high-temperature thermally-actuated, current cutoff device. The method comprises preparing a high-temperature pellet composition comprising a single organic crystalline compound and forming a high-temperature thermal pellet that maintains its structural rigidity up to a transition temperature of about 240° C. The method also comprises disposing the high-temperature thermal pellet into the thermally-actuated, current cutoff device. Next, at least two distinct curable polymeric precursors are combined, where at least one of the at least two distinct curable polymeric precursors is a curable epoxy resin. The at least two distinct curable polymeric precursors are applied to one or more openings of the thermally-actuated, current cutoff device. The method further includes curing the at least two distinct curable polymeric precursors to form a high-temperature seal comprising the epoxy resin that creates a barrier that interacts with the pellet composition to substantially prevent escape of the pellet composition into an external environment up to the transition temperature.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
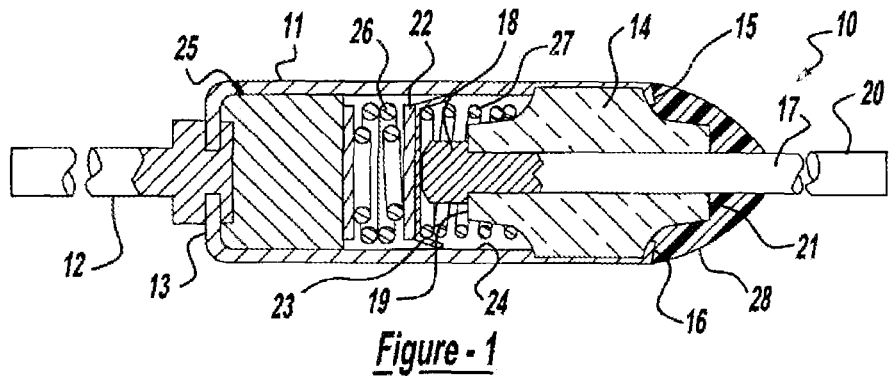
FIG. 1 is an enlarged cross sectional view of an exemplary thermal cutoff device construction.

The following description is merely exemplary in nature and is not intended to limit the present disclosure, application, or uses.

Various safety electrical current interruption devices, including thermal cut-off electrical current interruption safety devices (TCOs), meet a broad range of application temperatures and break electrical current above a threshold temperature or rating, typically ranging from about 60° C. up to about 235° C. However, conventional TCO devices are not rated for higher temperature applications, such as those greater than or equal to about 240° C. In other words, conventional TCO devices have not sufficiently fulfilled the performance criteria, particularly stability and robustness, for long-term use in high-temperature applications as a safety device.

In various aspects, the present disclosure provides a high temperature thermal cutoff device (referred to herein as a "HTTCO"). Such an HTTCO device is capable of switching continuity of an electrical circuit or electrical communication when the surrounding environment or operating temperature reaches a predetermined threshold temperature. By use of the term "high-temperature" thermal cutoff device, it is meant that device has a threshold or actuation temperature of greater than about 235° C., optionally greater than or equal to about 240° C., optionally greater than or equal to about 245° C., optionally greater than or equal to about 250° C., optionally greater than or equal to about 255° C., optionally greater than or equal to about 260° C., optionally greater than or equal to about 265° C., optionally greater than or equal to about 270° C., optionally greater than or equal to about 275° C., optionally greater than or equal to about 280° C., optionally greater than or equal to about 285° C., optionally greater than or equal to about 290° C., optionally greater than or equal to about 295° C., optionally greater than or equal to about 300° C., and in certain aspects, greater than or equal to about 305° C. In certain aspects, the HTTCO exhibits switching behavior at a threshold or actuation temperature of greater than or equal to about 240° C. to less than or equal to about 270° C., optionally greater than or equal to about 240° C. to less than or equal to about 265° C., optionally greater than or equal to about 240° C. to less than or equal to about 260° C., optionally greater than or equal to about 240° C. to less than or equal to about 255° C., optionally greater than or equal to about 240° C. to less than or equal to about 250° C., optionally greater than or equal to about 240° C. to less than or equal to about 245° C., optionally greater than or equal to about 240° C. to less than or equal to about 243° C. In certain aspects, the HTTCO exhibits switching behavior at a threshold temperature of about 240° C., optionally about 241° C., optionally about 242° C., optionally about 243° C., optionally about 244° C., optionally about 245° C., optionally about 246° C., optionally about 247° C., optionally about 248° C., optionally about 249° C., optionally about 250° C., optionally about 251° C., optionally about 252° C., optionally about 253° C., optionally about 254° C., optionally about 255° C., optionally about 256° C., optionally about 257° C., optionally about 258° C., optionally about 259° C., optionally about 260° C., optionally about 261° C., optionally about 262° C., optionally about 263° C., optionally about 264° C., optionally about 265° C., optionally about 266° C., optionally about 267° C., optionally about 268° C., optionally about 269° C., and in certain embodiments, optionally about 270° C.

An illustrative test demonstrating the performance of a high temperature thermal pellet composition includes continuous aging of HTTCO devices formed in accordance with the present teachings for at least 1,000 hours at a sustained temperature of 235° C. While the HTTCO ideally meets or exceeds the aforementioned illustrative test protocol, it should be understood by those skilled in the art that the compositions are contemplated as being useful for both low voltage and high voltage applications. Further, in certain aspects, the high temperature thermal pellet compositions meet or exceed Underwriters' Laboratory test UL1020 or IEC/EN 60691 standards, which are respectively incorporated herein by reference. In certain embodiments, HTTCO devices meet one or more of such standards at the preselected high temperature rating for the device. While the performance criteria is fully outlined in each of these standards, salient aspects of performance tests that demonstrate conformance to the IEC 60691, Third Edition standard are summarized in Table 1.

TABLE 1

| IEC 60691, 3$^{rd}$ Edition Tests | | | |
|---|---|---|---|
| I | | Clause 7 Ink Rub Test: | |
| | A | | Rub test sample with a cotton "wheel" soaked in water. |
| | B | | Take a photo. |
| | C | | After tensile, thrust, temperature/humidity, transient over load, temperature check, and dielectric/insulation testing repeat steps A and B. |
| II | | Clause 9.2 Tensile (pull) Test: | |
| | A | | Place sample in the fixture and apply 3.7 lbs tensile for one minute. |
| | B | | Release force and remove. |
| III | | Clause 9.3 Thrust (push) Test: | |
| | A | | Place sample in the fixture and apply 0.9 lbs thrust for one minute. |
| | B | | Release force and remove |

TABLE 1-continued

| | | IEC 60691, 3rd Edition Tests | |
|---|---|---|---|
| IV | | Clause 9.4 Twist/Bend Test: | |
| | A | | Bend contact lead 90°, twist lead 180°, and check for epoxy breakage. |
| V | | Clause 10.2 Temperature/ Humidity Test: | |
| | A | | Samples are subjected to two complete conditioning cycles: |
| | i | | 24 hours at rated functioning temperature minus 15° C.; |
| | ii | | 96 hours at 35° C. (+/−2°) and 95% R.H. (+/−5 R.H.); |
| | iii | | 8 hours AT 0° C. (+/−2°). |
| | B | | Samples are subjected to a third complete conditioning cycle: |
| | i | | 24 hours at rated functioning temperature minus 15° C.; |
| | ii | | 168 hours at 35° C. (+/−2°) and 95% R.H. (+/−5 R.H.); |
| | iii | | 8 hours AT 0° C. (+/−2°). |
| VI | | Clause 10.6 Current Interrupt Test: | |
| | A | | Sample is placed in a kiln at rated functioning temperature minus 10° C. for three minutes. |
| | B | | Sample is tested at 110% of rated voltage and 150% of rated current until sample interrupts the test current. |
| VII | | Clause 10.7 Transient Overload (pulse) Test: | |
| | A | | Samples are place in the current path of D.C. current pulses, with an amplitude of 15 times rated current for a duration of 3 ms with 10 s intervals are applied for 100 cycles. |
| VIII | | Clause 11.2 Temperature Check ($T_f$): | |
| | A | | Samples are placed in an oven at rated functioning temperature minus 10° C. until stable, the temperature is then increased steadily at 0.5° C./minute until all samples are opened, recording the temperature of opening to pass +0/−5° C. |
| IX | | Clause 11.3 Maximum Temperature ($T_m$): | |
| | A | | Samples are placed in a kiln at a specified temperature (470° C. +0/−5° for a 257° C. TCO) for 10 minutes, with the samples maintained at $T_m$ a dielectric test at 500 Vac with no breakdown, and an insulation resistance test at 500 Vdc with a minimum of 0.2 MΩ. |
| X | | Clause 11.4 Aging: | |
| | A | | Samples are placed in a kiln at 200° C. for three weeks. At the conclusion of this test at least 50% of samples shall not have functioned. |
| | B | | Samples are then placed in a kiln at rated functioning temperature minus 15° C. for three weeks. At the conclusion of this test at least 50% of samples shall not have functioned. |
| | C | | Samples are then placed in a kiln at rated functioning temperature minus 10° C. for two weeks. |
| | D | | Samples are then placed in a kiln at rated functioning temperature minus 5° C. for one week. |
| | E | | Samples are then placed in a kiln at rated functioning temperature minus 3° C. for one week. |
| | F | | Samples are then placed in a kiln at rated functioning temperature plus 3° C. for 24 hours. |
| | G | | This test is considered successful if all samples have functioned at the conclusion of step X(F). |

TABLE 1-continued

IEC 60691, 3rd Edition Tests

| | | |
|---|---|---|
| XI | Clause 10.3/10.4 Room Temperature Dielectric and Insulation Resistance: | |
| | A | All test samples must complete and comply with a dielectric test at 500 Vac with no breakdown, and an insulation resistance test at 500 Vdc with a minimum of 0.2 MΩ. |

In various aspects, the HTTCO of the present disclosure comprises a sealed housing having disposed therein a high-temperature thermal pellet having a transition temperature of greater than or equal to about 240° C. The transition temperature of the high-temperature thermal pellet relates to the threshold temperature at which the HTTCO device switches or actuates, as will be described in greater detail below. The high-temperature thermal pellet comprises at least one organic compound, which generally has a melting point or melting point range near the pre-selected or desired transition temperature. Further, the HTTCO has a high-temperature seal disposed in a portion of at least one opening of the housing that substantially seals the housing up to the transition temperature of the high-temperature thermal pellet. The HTTCO also comprises a current interruption assembly that is at least partially disposed within the housing. The current interruption assembly establishes electrical continuity in a first operating condition of the HTTCO, which corresponds to an operating temperature of less than the transition temperature of the high-temperature thermal pellet and that discontinues electrical continuity when the operating temperature exceeds the transition temperature.

Figure 2:
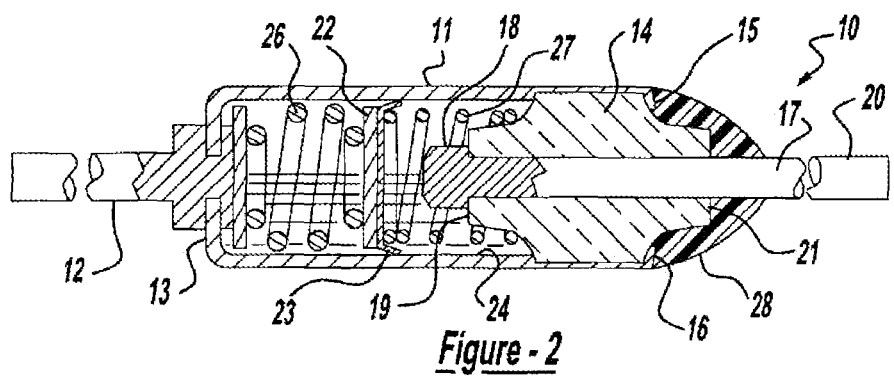
FIG. 2 illustrates the thermal cutoff construction of FIG. 1 after a thermal pellet has undergone a physical transition and a current interruption actuating assembly has caused electrical switching to break continuity and change the thermal cutoff device's operating condition.

An exemplary high-temperature TCO device is described herein, as set forth in FIGS. 1 and 2. In general, a TCO 10 includes a conductive metallic housing or casing 11 having a first metallic electrical conductor 12 in electrical contact with a closed end 13 of the housing 11. An isolation bushing 14, such as a ceramic bushing, is disposed in an opening 15 of the housing 11. Housing 11 further includes a retainer edge 16, which secures the ceramic bushing 14 within the end of the housing 11. An electric current interrupter assembly for actuating the device in response to a high temperature, for example, by breaking continuity of an electrical circuit, includes an electric contact 17, such as a metallic electrical conductor, at least partially disposed within the housing 11 through opening 15. Electric contact 17 passes through isolation bushing 14 and has an enlarged terminal end 18 disposed against one side 19 of isolation bushing 14 and a second end 20 projecting out of the outer end 21 of isolation bushing 14. A high-temperature seal 28 is disposed over the opening 15 and can create sealing contact with the housing 11 and its retainer edge 16, the isolation bushing 14, and the exposed portion of the second end 20 of electric contact 17. In this manner, an interior portion 29 of the housing 11 is substantially sealed from the external environment 30. By "substantially sealed" it is meant that the while the barrier seal is optionally porous at a microscopic level, the barrier is capable of preventing escape or significant mass loss of the thermal pellet material, for example, the seal retains at least about 95% of the mass of the initial thermal pellet through 1,000 hours of continuous operation at 235° C., optionally about 96% of the mass of the initial thermal pellet, optionally greater than about 97% of the mass of the initial thermal pellet, optionally greater than or equal to about 98% of the mass of the initial thermal pellet, optionally greater than or equal to about 99% of the mass of the initial thermal pellet, optionally greater than or equal to about 99.5% of the mass of the initial thermal pellet and in certain aspects, greater than or equal to about 99.9% of the mass of the initial thermal pellet is retained within the housing through continuous operation.

Figure 4:
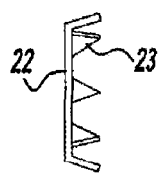
FIG. 4 is a side view of a sliding contact member of the current interruption actuating assembly switch construction of FIG. 1.

The current interruption assembly, which actuates or switches to change continuity of an electrical circuit, further includes a sliding contact member 22, formed of electrically conductive material, such as a metal is disposed inside the housing 11 and has resilient peripheral fingers 23 (FIG. 4) disposed in sliding engagement with the internal peripheral surface 24 of the housing 11 to provide electrical contact there between. Moreover, when the TCO has an operating temperature that is below the predetermined threshold set-point temperature of the TCO device, the sliding contact member 22 is disposed in electrical contact with the terminal end 18 of electric contact 17.

Current interruption assembly also includes a tensioning mechanism, which may include a plurality of tensioning mechanisms. The tensioning mechanism biases the sliding contact member 22 against the terminal end 18 of electric contact 17 to establish electrical contact in the first operating condition (where operating temperatures are below the threshold temperature of the TCO device, as will be described below). As shown in FIGS. 1 and 2, the tensioning mechanism includes a pair of springs, which are respectively disposed on opposite sides of the sliding contact member 22. The springs include a compression spring 26 and an expansion trip spring 27.

Figure 3:
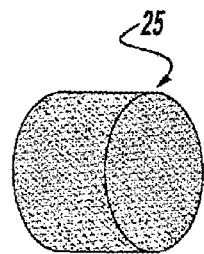
FIG. 3 is a side perspective view illustrating a high-temperature thermal pellet according to certain aspects of the present disclosure.
Figure 7:
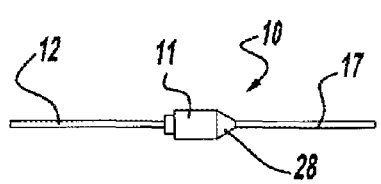
FIG. 7 is an elevation view of a thermal cutoff device of FIG. 1.

A high-temperature thermally responsive pellet or thermal pellet 25, as best illustrated in FIG. 3, is disposed in the housing 11 against the end wall 13 thereof. The compression spring 26 is in a compressed state between the high-temperature solid thermal pellet 25 and the sliding contact member 22 and in the exemplary design shown, generally has a stronger compressed force than the force of the expansion trip spring 27, which is disposed between the contact member 22 and the isolation bushing 14, such that the sliding contact member 22 is biased towards (e.g., held by the force of the spring 26) and in electrical contact with the enlarged end 18 of the electrical contact 17. In this manner, an electrical circuit is established between the first electrical conductor 12 and electrical contact 17 through the conductive housing 11 and sliding contact member 22.

As noted above, the TCO device is designed to include a high-temperature thermal pellet 25 that is reliably stable in the first operating condition (where the operating temperature, for example, the temperature of the surrounding environment 30 is below a threshold temperature); however reliably transitions to a different physical state when the operating temperature meets or exceeds such threshold temperature in a second operating condition. In such conditions, where the operating temperature meets or exceeds a threshold temperature, the high-temperature thermal pellet 25 melts, liquefies, softens, volatilizes, or otherwise transitions to a different physical state during an adverse heating condition, which is illustrated in FIG. 2.

Figure 5:
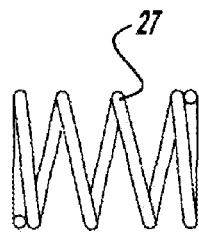
FIG. 5 is a side view of one of the springs of the current interruption actuating assembly of FIG. 1.
Figure 6:
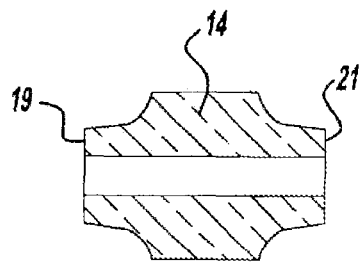
FIG. 6 is a cross sectional view of a ceramic bushing of FIG. 1.

The springs 26 and 27 are adapted to expand and release, as illustrated by expansion trip spring 27 in FIG. 5, and through the relationship of the particular forces and length of the compression spring 26 and expansion trip spring 27, the sliding contact member 22 is moved out of electrical contact with the end 18 of the electric contact 17 in the manner shown in FIG. 2, so that the electrical circuit between the terminal conductor 12 and electrical contact 17 through the thermal cutoff construction 10 (via the housing 11 and sliding contact member 22) is discontinued and broken, remaining open as illustrated in FIG. 2.

The thermal cutoff device described in the present disclosure are used for purposes of illustration are exemplary and in certain aspects, should not be construed to be limiting. In certain aspects, various components, designs, or operating principles may be varied in number or design. Various other thermal switching or cutoff devices are known in the art and likewise contemplated.

In various aspects, the high-temperature thermal pellet compositions of the present teachings are thermally and chemically stable, reliable, and robust for use in the HTTCO application. Preferably, the high-temperature thermal pellet composition will include one or more organic compounds, such as crystalline organic compounds. In various aspects, the high-temperature thermal pellet compositions are designed to have a transition temperature that permits the HTTCO device to have a final temperature ($T_f$) (also referred to as actuation or threshold temperature) where the internal contact breaks electrical continuity due to structural changes in the pellet composition, which in turn causes opening of tensioning mechanisms, for example. Thus, the transition temperature of the high-temperature thermal pellet directly corresponds to the threshold temperature $T_f$ of the HTTCO device, whereby a switch in continuity is activated. As noted above, the transition temperature generally refers to the temperature at which a pellet melts, liquefies, softens, volatilizes, sublimates, or otherwise transitions to a different physical state to transform from a solid having structural rigidity to a form or phase that loses structural rigidity, either by contraction, displacement, or other physical changes, which cause the internal electrical contacts to separate due to the applied tension from the tensioning mechanism. Thus, as used herein, once the thermal pellet material reaches it transition temperature, it means that the material no longer possesses the structural integrity required to maintain a tensioning mechanism, such as a switch in a held-open or held-closed position, depending on the HTTCO device, for example.

As referred to herein, this transition temperature is also referred to as a "melting-point"; however, the compounds in the pellet composition need not fully melt in a conventional sense to achieve separation of the electrical contacts to break the internal circuit and electrical continuity. As recognized by those of skill in the art, a melting-point temperature is one where compounds or compositions transform from solid to liquid phase, which may occur at a range of temperatures, rather than at a single discrete temperature point. In certain aspects, the high temperature thermal pellet may soften or sublimate rather than melting, by way of non-limiting example, to achieve the separation of electrical contacts to break the circuit. Melting-point temperatures can be measured in various apparatuses, such as those produced by Thomas Hoover, Mettler and Fisher-Johns companies. Differential Scanning Colorimetry (DSC) techniques are also commonly used. Different measurement techniques may result in differing melting points, for example, optical analysis methods like Fisher-Johns measure light transmittance through a sample, a solid to liquid phase change. Early optical methods potentially suffered greater observer error versus more modern light beam transmittance melt point indicators. In addition, earlier techniques to determine melting point (before the use of digital high speed scan capabilities), rendered a broader range of results for melt points and other transitions. Likewise, before the advent of HPLC and other precise analytical techniques for determination of purity, the melt point of a sample, for example, measured by DSC, which measures heat flow behavior for example, crystallinity (solid-solid phase) changes as well as, solid to liquid phase changes, could show the solid-solid phase change of an impurity that may have been reported as a melt point, such as dehydration or breaking of hydroxyl bonds, as well as the solid-liquid phase change at the melt point for the material of interest. Thus, in various aspects, a composition can be selected for use in the thermal pellet that empirically exhibits a desirable physical change that will enable a pellet's physical transition without necessarily correlating to the predicted melting point ranges.

In certain aspects, the high-temperature thermal pellet 25 has a relatively rapid and repeatable collapse rate, meaning once the environment 30 reaches a threshold temperature, the rate at which the high-temperature thermal pellet composition 25 physically collapses is relatively high. By way of example, one method of testing a pellet collapse rate is via thermomechanical analysis (TMA) where a pellet is heated at a rapid rate to within about 10° C.-15° C. of the predicted melting point temperature, then a heating rate is selected, for example about 0.5° C./min through the predicted melting point temperature range. The physical height of the pellet is likewise measured at the beginning of the test and throughout this heating process, so that an amount of displacement from the top surface of the pellet to the underlying substrate (on which the pellet is initially placed) is measured. The rate, measured in micrometer per ° C., at which the pellet height collapses at the onset through to the end of the transition temperature correlates to the pellet collapse rate, for example, a 75% reduction of a pellet's height from a threshold temperature within about 100 micrometer/° C., optionally about 500 micrometer/° C., optionally about 1000 micrometer/° C. In various aspects, both the solid liquid phase transition temperature and pellet collapse rate are salient features of the high-temperature thermal pellet 25, as the rapidity with which the pellet collapses ensures sufficient separation of electrical contacts in the HTTCO to avoid excessive arcing, which could melt various components and potentially impact HTTCO performance. Methods of testing and quantifying such a pellet collapse rate will be described in further detail below.

In certain aspects, the thermal pellet comprises one or more organic compounds having a melting-point temperature (mp) that occurs in a range of temperatures corresponding to the desired transition temperature. By way of example, in certain aspects, the high-temperature thermal pellet has one or more organic compounds that have a melting point temperature (mp) within about 5° C. below the transition temperature and within about 2° C. above the transition temperature (i.e., where $T-5°\,C.\leq mp\leq T_+2°\,C.$), where T is the transition temperature.

In various aspects, the high-temperature thermal pellet compositions comprise organic compounds or materials that are selected to meet one or more of the following criterion. In certain aspects, the organic compositions selected for use in the high-temperature thermal pellet have a relatively high chemical purity. For example, in certain embodiments, desirable chemical candidates for the high temperature thermal pellet compositions have a range of purity levels from about 95% up to 99+%. In certain aspects, the organic compositions selected for use in the high temperature thermal pellets are particularly suitable for processing, handling, and toxicity characteristics. In certain embodiments, the organic chemical compounds or compositions selected for use in the high-temperature pellet compositions have a median lethal dose toxicity value ($LD_{50}$) less than or equal to about 220 mg/kg (ppm) for a mouse; less than or equal to about 400 mg/kg (ppm) for a rabbit; and less than or equal to about 350 mg/kg (ppm) for a rat. Further, in certain aspects, the selected organic chemical compositions for the high-temperature thermal pellet desirably do not have documented carcinogenicity effects, mutagenicity effects, neurotoxicity effects, reproductive effects, teratogenicity effects, and/or other harmful health or epidemiological effects. In yet other aspects, the organic components for the high temperature thermal pellet compositions are selected such that alternate reactive residuals, reaction products formed during manufacture, decomposition products, or other species that might be formed during manufacture, storage, or use are absent, minimized, or are capable of purification and removal of such undesired species.

In certain aspects, the compositions selected for use in the high temperature thermal pellet composition exhibit long-term stability. By way of example, compositions are optionally selected to possess temperature or thermal stability, in other words, chemical compounds that show decomposition or volatility behavior within about 10° C., optionally within about 20° C., optionally within about 30° C., optionally within about 40° C., optionally within about 50° C., optionally within about 60° C., optionally within about 75° C., and in certain aspects, optionally within about 100° C. of the transition temperature or melting point of the organic compound may be rejected as viable candidates. Further, in certain embodiments, chemical compositions suitable for use as high-temperature thermal pellet compositions will not show a strong likelihood of heat-induced and age-progressive oxidation or decomposition.

Further, suitable compositions for high-temperature thermal pellets include those that are "electrically non-conductive," meaning that the composition is capable of withstanding a 240 volt, 60 Hz sinusoidal potential between two electrodes at least about 5° C. above the $T_f$ final temperature for at least one minute without conducting greater than 250 mA. In certain aspects, the select composition should be capable of withstanding a 240 volt, 60 Hz sinusoidal potential at least 10° C. above the $T_f$ final temperature for at least about one minute without conducting greater than 250 mA. In yet other aspects, the high-temperature thermal cutoff compositions are optionally capable of withstanding a 240 volt, 60 Hz sinusoidal potential at least 50° C. above the final transition temperature $T_f$ for at least about one minute without conducting greater than 250 mA of current.

In various aspects, the organic chemical compositions that are selected for use in the high temperature thermal composition have an initial melting point temperature of at least about 240° C., optionally about 241° C., optionally about 242° C., optionally about 243° C., optionally about 244° C., optionally about 245° C., optionally about 246° C., optionally about 247° C., optionally about 248° C., optionally about 249° C., optionally about 250° C., optionally about 251° C., optionally about 252° C., optionally about 253° C., optionally about 254° C., optionally about 255° C., optionally about 256° C., optionally about 257° C., optionally about 258° C., optionally about 259° C., optionally about 260° C., optionally about 261° C., optionally about 262° C., optionally about 263° C., optionally about 264° C., optionally about 265° C., optionally about 266° C., optionally about 267° C., optionally about 268° C., optionally about 269° C., optionally about 270° C., optionally about 271° C., optionally about 272° C., optionally about 273° C., optionally about 274° C., optionally about 275° C., optionally about 276° C., optionally about 277° C., optionally about 278° C., optionally about 279° C., optionally about 280° C., optionally about 281° C., optionally about 282° C., optionally about 283° C., optionally about 284° C., optionally about 285° C., optionally about 286° C., optionally about 287° C., optionally about 288° C., optionally about 289° C., optionally about 290° C., optionally about 291° C., optionally about 292° C., optionally about 293° C., optionally about 294° C., optionally about 295° C., optionally about 296° C., optionally about 297° C., optionally about 298° C., optionally about 299° C., optionally about 300° C., and in certain embodiments, optionally about 301° C. In certain aspects, the melting point of the organic composition for the high-temperature thermal pellet is greater than 275° C. and in certain aspects, optionally greater than 300° C. In certain embodiments, organic compounds that meet the above selection criteria and that can remain a solid at temperatures ranging from 50° C. to at least 235° C. are desirable. In certain aspects, organic compounds that can remain a stable solid up to about 236° C., optionally up to about 237° C., optionally up to about 238° C., optionally up to about 239° C., optionally up to about 240° C., optionally up to about 245° C., optionally up to about 250° C., optionally up to about 255° C., optionally up to about 260° C., optionally up to about 265° C., optionally up to about 270° C., optionally up to about 275° C., optionally up to about 280° C., optionally up to about 285° C., optionally up to about 290° C., optionally up to about 295° C., and in certain aspects, optionally up to or exceeding about 300° C.

Suitable organic compound candidates for the high-temperature thermal pellets of the HTTCO devices of the present disclosure optionally include the following additional characteristics. In certain embodiments, organic chemicals having acidic structures, such as structures with multiple hydroxides or structures which might have ionic activity in an electrical field may be avoided or minimized. Further, certain organic compounds having side groups comprising sulfur can be avoided, as are compounds having bond structures that easily break down in an electrical field in certain applications.

In certain embodiments, the selection of organic compounds useful as a thermal cutoff composition herein can be made based on the chemical's behavior in relation to and interaction with the seal material for the housing of the HTTCO, which often is a porous polymeric structure. Suitable organic chemical compounds for the high-temperature thermal pellet include those having a relatively large molecular size, for example, organic molecules having ring structures, such as those that occupy dimensional space due to bending or side groups. In certain aspects, suitable chemical candidates having flat or unbent conformations or chemical structures, which may have shear mobility or a relatively unimpaired navigation path through the pores in the seal material, are avoided. As such, in certain aspects, the organic chemical compounds selected for use in the high-temperature thermal pellet compositions have relative molecular complexity, such as organic polycyclic ring structures with complex bond orientations that create irregular dimensional space filling configurations or conformations. For example, certain chemical structures that "tangle" at high energy states are desirable, as are relatively large organic species having complex side chains.

Furthermore, suitable chemical compounds for the high-temperature thermal compositions of the present disclosure include those that have high molecular bond strength, for example, in ring structures like polyaromatic, polyalkyl, heteroalkyl rings, including fused ring structures that share one or more common bonds. Chemical structures having high intrabond strength with other rings or side groups are also suitable organic species. Further, chemical compounds having intermolecular bond strength, including non-polar or relatively low polar strength structures with high instantaneous polarizability are also suitable. For example, structures with side groups that have "bond affinities" for the parent ring or side groups of other molecular groups are desirable.

High melting point aromatic compounds have been shown to provide unique bond strength, relatively large molecule size and electronegativity characteristics desirable to perform as high-temperature thermal cutoff organic compounds when formulated into solid shapes such as pellets and the like. In certain embodiments, the thermal cutoff composition can include one or more aromatic compounds, one or more five-membered ring compounds, polymers, co-polymers, and mixtures thereof.

In certain aspects, the high-temperature thermal pellets may comprise a plurality of organic compounds as primary components. Thus, the high-temperature pellet compositions for the HTTCO devices of the present disclosure optionally comprise one or more organic compounds that will provide a transition temperature of greater than or equal to about 240° C. In certain aspects, a plurality of such organic compositions can be used, such that the resulting melting point of the mixture provides the predetermined desired transition temperature for the pellet composition. As recognized by those of skill in the art, the combination of various organic compositions or other components will result in a thermal pellet transition temperature $T_x$ expressed by the following relationship of $$\sum_n^1 X_n \times mp_n(° C.) = T_x,$$

where $X_n$ is the mass fraction of each respective component present in the pellet composition (where n is greater than 1) and "$mp_n$" is the initial melting point temperature for each respective component. In this manner, a transition temperature of the thermal pellet can be predicted based on the respective melting points of a plurality of organic compounds present in the thermal pellet composition. In certain aspects, the pellet composition may comprise a single organic composition as the primary ingredient to arrive at a $T_x$ of greater than or equal to about 240° C. In other aspects, the pellet composition may comprise a plurality of organic compositions, for example two or more organic compounds, to arrive at a $T_x$ of greater than or equal to about 240° C. Such organic compounds may have different melting point temperatures or other properties and are can be combined by co-precipitation, co-crystallization, mixing, blending, milling, or otherwise combined in a suitable manner known in the art.

In some embodiments, a high-temperature thermal pellet composition comprises one or more compounds, which includes compounds with a chemical structure having one or more six-member rings that has a basic backbone of carbon with side constituent groups that may be the same or different. In some embodiments, the thermal cutoff composition can include one or more chemical entities generally described by a structural repeating unit (SRU): (-PhRR'—)$_n$ where R and R' may be the same or different side constituent groups, and wherein n may also be a value or greater than or equal to 1, designating the repetition of the structure repeating unit (SRU). In some embodiments, the high temperature thermal pellet composition can include one or more 5 member ring structures, where the side groups and/or SRU may have may be the same or different entities (e.g., having different side constituent groups) such as, for example, where the thermal cutoff composition is described as an example, by the nominal SRU formula, (-Ph-RR$^1$—)$_n$—(-Ph-R$^2$R$^3$)$_m$, wherein R and R$^1$ are distinct side groups from R$^2$ and R$^3$. In some embodiments, R and R$^1$ may be the same or different, and similarly, R$^2$ and R$^3$ may be the same or different.

In some embodiments, the term "hydrocarbyl" is used herein to refer generally to organic groups comprised of carbon chains to which hydrogen and optionally other elements are attached. $CH_2$ or CH groups and C atoms of the carbon chains of the hydrocarbyl may be replaced with one or more heteroatoms (i.e., non-carbon atoms). Suitable heteroatoms include but are not limited to O, S, P and N atoms. Illustrative hydrocarbyl groups can include, but are not limited to. alkyl, alkenyl, alkynyl, ether, polyether, thioether, straight chain or cyclic saccharides, ascorbate, aminoalkyl, hydroxylalkyl, thioalkyl, aryl and heterocyclic aryl groups, optionally substituted tricyclic molecules, amino acid, polyalcohol, glycol, groups which have a mixture of saturated and unsaturated bonds, carbocyclic rings and combinations of such groups. The term also includes straight-chain, branched-chain and cyclic structures or combinations thereof. Hydrocarbyl groups are optionally substituted. Hydrocarbyl substitution includes substitution at one or more carbons in the group by moieties containing heteroatoms.

Suitable substituents for hydrocarbyl groups include but are not limited to halogens, including chlorine, fluorine, bromine and iodine, OH, SH, —N—OH, NH, $NH_2$, —C—$NH_2$=S, CH, —CH—O, C=N, —C—N=O, —C—$NH_2$=O, C=O, COH, —C—$NH_2$=S, $CO_2$, H, —CHBN, —CHP, OR$^1$, SR$^1$ NR$^1$, R", CONR$^1$R$^2$, and combinations thereof, where R$^1$ and R$^2$ independently are alkyl, unsaturated alkyl or aryl groups. The term "alkyl" takes its usual meaning in the art and is intended to include straight-chain, branched and cycloalkyl groups. The term includes, but is not limited to, methyl, ethyl, n-propyl, isopropyl, n-butyl, sec-butyl, isobutyl, tert-butyl, n-pentyl, neopentyl, 2-methylbutyl, 1-methylbutyl, 1-ethylpropyl, 1,1-dimethylpropyl, n-hexyl, 1-methylpentyl, 2-methylpentyl, 3-methylpentyl, 4-methylpentyl, 3,3-dimethylbutyl, 2,2-dimethylbutyl, 1,1-dimethylbutyl, 2-ethylbutyl, 1-ethylbutyl, 1,3-dimethylbutyl, n-heptyl, 5-methylhexyl, 4-methylhexyl, 3-methylhexyl, 2-methylhexyl, 1-methylhexyl, 3-ethylpentyl, 2-ethylpentyl, 1-ethylpentyl, 4,4-dimethylpentyl, 3,3-dimethylpentyl, 2,2-dimethylpentyl, 1,1-dimethylpentyl, n-octyl, 6-methylheptyl, 5-methylheptyl, 4-methylheptyl, 3-methylheptyl, 2-methylheptyl, 1-methylheptyl, 1-ethylhexyl, 1-propylpentyl, 3-ethylhexyl, 5,5-dimethylhexyl, 4,4-dimethylhexyl, 2,2-diethylbutyl, 3,3-diethylbutyl, and 1-methyl-1-propylbutyl. Alkyl groups are optionally substituted. Lower alkyl groups are $C_1$-$C_6$ alkyl and include among others methyl, ethyl, n-propyl, and isopropyl groups.

The term "cycloalkyl" refers to alkyl groups having a hydrocarbon ring, particularly to those having rings of 3 to 7 carbon atoms. Cycloalkyl groups include those with alkyl group substitution on the ring. Cycloalkyl groups can include straight-chain and branched-chain portions. Cycloalkyl groups include but are not limited to cyclopropyl, cyclobutyl, cyclopentyl, cyclohexyl, cycloheptyl, cyclooctyl, and cyclononyl. Cycloalkyl groups can optionally be substituted.

Aryl groups may be substituted with one, two or more simple substituents including, but not limited to, lower alkyl, e.g., $C_1$-$C_4$, methyl, ethyl, propyl, butyl; halo, e.g., chloro, bromo; nitro; sulfato; sulfonyloxy; carboxy; carbo-lower-alkoxy, e.g., carbomethoxy, carbethoxy; amino; mono- and di-lower-alkylamino, e.g., methylamino, ethylamino, dimethylamino, methylethylamino; amido; hydroxy; lower-alkoxy, e.g., methoxy, ethoxy; and lower-alkanoyloxy, e.g., acetoxy.

The term "unsaturated alkyl" group is used herein generally to include alkyl groups in which one or more single carbon-carbon bonds are double or triple carbon-carbon bonds. The term includes alkenyl and alkynyl groups in their most general sense. The term is intended to include groups having more than one double or triple bond, or combinations of double and triple bonds. Unsaturated alkyl groups include, without limitation, unsaturated straight-chain, branched or cycloalkyl groups. Unsaturated alkyl groups include without limitation: vinyl, allyl, propenyl, isopropenyl, butenyl, pentenyl, hexenyl, hexadienyl, heptenyl, cyclopropenyl, cyclobutenyl, cyclopentenyl, cyclopentadienyl, cyclohexenyl, cyclohexadienyl, 1-propenyl, 2-butenyl, 2-methyl-2-butenyl, ethynyl, propynyl, 3-methyl-1-pentynyl, and 2-heptynyl. Unsaturated alkyl groups can optionally be substituted.

Substitution of alkyl, cycloalkyl and unsaturated alkyl groups includes substitution at one or more carbons in the group by moieties containing heteroatoms. Suitable substituents for these groups include but are not limited to OH, SH, $NH_2$, COH, $CO_2H$, $OR^3$, $SR^3$, P, PO, $NR^3R^4$, $CONR^3R^4$, and halogens, particularly chlorines and bromines where $R^3$ and $R^4$, independently are alkyl, unsaturated alkyl or aryl groups. Suitable alkyl and unsaturated alkyl groups are the lower alkyl, alkenyl or alkynyl groups having from 1 to about 5 carbon atoms.

The term "aryl" is used herein generally to refer to aromatic groups which have at least one ring having a conjugated pi electron system and includes without limitation carbocyclic aryl, aralkyl, heterocyclic aryl, biaryl groups and heterocyclic biaryl, all of which can be optionally substituted. Preferred aryl groups have one or two aromatic rings. "Carbocyclic aryl" refers to aryl groups in which the aromatic ring atoms are all carbons and includes without limitation phenyl, biphenyl and napthalene groups.

"Aralkyl" refers to an alkyl group substituted with an aryl group. Suitable aralkyl groups include among others benzyl, phenethyl, and may be optionally substituted, such as picolyl substituted with nitrogen. Aralkyl groups include those with heterocyclic and carbocyclic aromatic moieties.

"Heterocyclic aryl groups" refers to groups having at least one heterocyclic aromatic ring with from 1 to 3 heteroatoms in the ring, the remainder being carbon and hydrogen atoms. Suitable heteroatoms include without limitation oxygen, sulfur, and nitrogen. Heterocyclic aryl groups include among others furanyl, thienyl, pyridyl, pyrrolyl, N-alkyl pyrrolo, pyrimidyl, pyrazinyl, imidazolyl, benzofuranyl, quinolinyl, and indolyl, all optionally substituted.

"Heterocyclic biaryl" refers to heterocyclic aryls in which a phenyl group is substituted by a heterocyclic aryl group ortho, meta or para to the point of attachment of the phenyl ring to the decalin or cyclohexane. Heterocyclic biaryl includes among others groups which have a phenyl group substituted with a heterocyclic aromatic ring. The aromatic rings in the heterocyclic biaryl group can be optionally substituted.

"Biaryl" refers to carbocyclic aryl groups in which a phenyl group is substituted by a carbocyclic aryl group ortho, meta or para to the point of attachment of the phenyl ring to the decalin or cyclohexane. Biaryl groups include among others a first phenyl group substituted with a second phenyl ring ortho, meta or para to the point of attachment of the first phenyl ring to the decalin or cyclohexane structure. Para substitution is preferred. The aromatic rings in the biaryl group can be optionally substituted.

Aryl group substitution includes substitutions by non-aryl groups (excluding H) at one or more carbons or where possible at one or more heteroatoms in aromatic rings in the aryl group. Unsubstituted aryl, in contrast, refers to aryl groups in which the aromatic ring carbons are all substituted with H, e.g. unsubstituted phenyl (—$C_6H_5$), or naphthyl (—$C_{10}H_7$). Suitable substituents for aryl groups include among others, alkyl groups, unsaturated alkyl groups, halogens, OH, SH, $NH_2$, COH, $CO_2H$, $OR^5$, $SR^5$, $NR^5R^6$, $CONR^5R^6$, where $R^5$ and $R^6$ independently are alkyl, unsaturated alkyl or aryl groups. Preferred substituents are OH, SH, $OR^5$, and $SR^5$ where $R^5$ is a lower alkyl, i.e., an alkyl group having from 1 to about 5 carbon atoms. Other preferred substituents are halogens, more preferably chlorine or bromine, and lower alkyl and unsaturated lower alkyl groups having from 1 to about 5 carbon atoms. Substituents include bridging groups between aromatic rings in the aryl group, such as —$CO_2$—, —CO—, —O—, —S—, —P—, —NH—, —CH=CH— and —$(CH_2)_I$— where I is an integer from 1 to about 5, and particularly —$CH_2$— where I is 1. Examples of aryl groups having bridging substituents include phenylbenzoate. Substituents also include moieties, such as —$(CH_2)_J$—, —O—$(CH_2)_J$— or —OCO—$(CH_2)_J$—, where J is an integer from about 2 to 7, as appropriate for the moiety, which bridge two ring atoms in a single aromatic ring as, for example, in a 1, 2, 3, 4-tetrahydronaphthalene group. Alkyl and unsaturated alkyl substituents of aryl groups can in turn optionally be substituted as described supra for substituted alkyl and unsaturated alkyl groups.

The terms "alkoxy group" and "thioalkoxy group" (also known as mercaptide groups, the sulfur analog of alkoxy groups) take their generally accepted meaning. Alkoxy groups include but are not limited to methoxy, ethoxy, n-propoxy, isopropoxy, n-butoxy, sec-butoxy, isobutoxy, tert-butoxy, n-pentyloxy, neopentyloxy, 2-methylbutoxy, 1-methylbutoxy, 1-ethyl propoxy, 1,1-dimethylpropoxy, n-hexyloxy, 1-methylpentyloxy, 2-methylpentyloxy, 3-methylpentyloxy, 4-methylpentyloxy, 3,3-dimethylbutoxy, 2,2-dimethoxybutoxy, 1-1-dimethylbutoxy, 2-ethylbutoxy, 1-ethylbutoxy, 1,3-dimethylbutoxy, n-pentyloxy, 5-methylhexyloxy, 4-methylhexyloxy, 3-methylhexyloxy, 2-methylhexyloxy, 1-methylhexyloxy, 3-ethylpentyloxy, 2-ethylpentyloxy, 1-ethylpentyloxy, 4,4-dimethylpentyloxy, 3,3-dimethylpentyloxy, 2,2-dimethylpentyloxy, 1,1-dimethylpentyloxy, n-octyloxy, 6-methylheptyloxy, 5-methylheptyloxy, 4-methylheptyloxy, 3-methylheptyloxy, 2-methylheptyloxy, 1-methylheptyloxy, 1-ethylhexyloxy, 1-propylpentyloxy, 3-ethylhexyloxy, 5,5-dimethylhexyloxy, 4,4-dimethylhexyloxy, 2,2-diethylbutoxy, 3,3-diethylbutoxy, 1-methyl-1-propylbutoxy, ethoxymethyl, n-propoxymethyl, isopropoxymethyl, sec-butoxymethyl, isobutoxymethyl, (1-ethyl propoxy)methyl, (2-ethylbutoxy)methyl, (1-ethylbutoxy)methyl, (2-ethylpentyloxy)methyl, (3-ethylpentyloxy)methyl, 2-methoxyethyl, 1-methoxyethyl, 2-ethoxyethyl, 3-methoxypropyl, 2-methoxypropyl, 1-methoxypropyl, 2-ethoxypropyl, 3-(n-propoxy)propyl, 4-methoxybutyl, 2-methoxybutyl, 4-ethoxybutyl, 2-ethoxybutyl, 5-ethoxypentyl, and 6-ethoxyhexyl. Thioalkoxy groups include but are not limited to the sulfur analogs of the alkoxy groups specifically listed supra.

In some embodiments, the R, $R^1$, $R^2$, $R^3$, $R^4$, $R^5$ and $R^6$ side groups in the 5 and 6 member ring can be independently selected from any of the aforementioned hydrocarbyl substituents, for example, —CH, —CH—O, —CH—OH, —$NH_2$, —NH, —CH—N, —CH=O, —N—OH, —CHBN, —CHP or mixtures thereof.

In certain aspects, one particularly suitable organic compounds for use in a high-temperature thermal pellet composition of the present teachings is triptycene or tryptycene (9,10-dihydro-9,10-o-benzeno-9,10-dihydroanthracene-CAS Registry No. 477-75-8), which has a transition temperature of about 255° C. and a melting point temperature range of 255° C. to about 257° C. Triptycene is generally classified as a polycyclic aromatic hydrocarbon and is generally represented by the exemplary Formula (I):

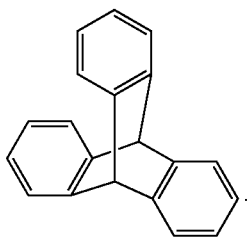

(I)

Triptycene can be prepared by the reduction of the anthracene-benzoquinone adduct with lithium aluminum hydride or sodium borohydride, among other methods known to those in the art. Tryptycene, or triptycene (also known as) is described in Organic Syntheses, Coll. Vol. 4, p. 964 (1963), the relevant portions of which are incorporated herein by reference.

In certain other aspects, a particularly suitable organic compound for use in a high-temperature thermal pellet composition of the present teachings is 1-aminoanthraquinone (also known as 1-Amino-9,10-anthracenedione-CAS Registry No. 82-45-1), which is classified as a polycyclic aromatic hydrocarbon with constituent side groups —C=O and C—$NH_2$ as represented in Formula (II):

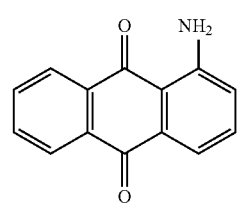

(II)

1-Aminoanthraquinone has an expected transition temperature of about 253° C., with a melting point range of 253° C. to about 257° C. 1-Aminoanthraquinone (1-AAQ) can be prepared by the reaction of 2-chlorobenzyl chloride and xylene in the presence of a solid acid catalyst, or other methods known in the art. 1-aminoanthraquinone (also known as 1-Amino-9,10-anthracenedione) described in U.S. Pat. Nos. 4,006,170 and 4,695,407, the relevant portions of which are incorporated herein by reference.

By way of non-limiting example, other representative organic compounds, such as the exemplary compounds set forth in Table 2 below are also believed to be highly suitable candidates for the high-temperature thermal pellet compositions for the HTTCO devices of the present disclosure, based on the criteria discussed above and the estimated melting point temperature ranges set forth below. However, the present disclosure further contemplates various other organic compounds, which while not listed herein, fulfill one or more of the criteria listed above including the melting point data that corresponds to a transition temperature above about 240° C. As noted above, predicted melting point ranges may differ based on analytic techniques used (thus certain compounds have multiple or differing melting points) and such compositions are selected to have an empirical transition temperature that performs in a thermal pellet to physically transition and change electrical continuity at a desired threshold temperature.

TABLE 2

| Example | Melting Point | Name | IUPAC Name | CAS Registry No. |
|---|---|---|---|---|
| 1 | 241° C. | Zaprinast | 5-(2-propoxyphenyl)-2,3-dihydrotriazolo[4,5-e]pyrimidin-7-one | 37762-06-4 |
| 2 | 241-243° C. | Ropinirole hydrochloride | 4-[2-(dipropylamino)ethyl]-1,3-dihydroindol-2-one hydrochloride | 91374-20-8 |
| 3 | 241° C. | Triphenylguanidine hydrochloride | (N,N'-diphenylcarbamimidoyl)-phenylazanium chloride | 59283-92-0 |
| 4 | 241-242° C. | Naphthacene, 1,4,5,6,7,10,11,12-octahydro- | 1,4,5,6,7,10,11,12-octahydrotetracene | 60700-47-2 |
| 5 | 241-244° C. | 3-Ethoxybenzonitrile | 3-ethoxybenzonitrile | 25117-75-3 |
| 6 | 241-242° C. | Cis-1,2,3,4-Tetrahydro-1-amino-N-methyl-4-phenylnaphthalene hydrochloride | (1S,4S)-N-methyl-4-phenyl-1,2,3,4-tetrahydronaphthalen-1-amine hydrochloride | 52371-38-7 |
| 7 | 241° C. | 2,7-Dimethylanthracene | 2,7-dimethylanthracene | 782-23-0 |
| 8 | 240-243° C. | Sesbanine | 3'-hydroxyspiro[2,7-naphthyridine-4,1'-cyclopentane]-1,3-dione | 70521-94-7 |

TABLE 2-continued

| Example | Melting Point | Name | IUPAC Name | CAS Registry No. |
|---|---|---|---|---|
| 9 | 241-243° C. | 1,3,4-Oxadiazole, 2-amino-5-phenyl- | 5-phenyl-1,3,4-oxadiazol-2-amine | 1612-76-6 |
| 10 | 241° C. | Acenaphtho(1,2-b]quinoxaline | acenaphthyleno[1,2-b)quinoxaline | 207-11-4 |
| 11 | 242° C. | Oxyphenisatin Acetate | [4-[3-(4-acetyloxyphenyl)-2-oxo-1H-indol-3-yl]phenyl] acteate | 115-33-3 |
| 12 | 242° C. | 4-Nitrobenzimidazole | 4-nitro-1H-benzimidazole | 10597-52-1 |
| 13 | 242-244° C. | Biotinamide | 5-[(3aR,6S,6aS)-2-oxo-1,3,3a,4,6,6a-hexahydrothieno[3,4-d]imidazol-6-yl]pentanamide | 6929-42-6 |
| 14 | 242° C. | Tropine isobutyrate | [(1S,5R)-8-methyl-8-azabicyclo[3.2.1]octan-3-yl] 2-methylpropanoate | 495-80-7 |
| 15 | 242° C. | Phenol, 2-(1H-benzimidazol-2-yl)- | 6-(1,3-dihydrobenzimidazol-2-ylidene)cyclohexa-2,4-dien-1-one | 2963-66-8 |
| 16 | 242-245° C. | Bufalone | 5-[(5R,8R,9S,10S,13R,14S,17R)-14-hydroxy-10,13-dimethyl-3-oxo-2,4,5,6,7,8,9,11,12,15,16,17-dodecahydro-1H-cyclopenta[a]phenanthren-17-yl]pyran-2-one | 4029-65-6 |
| 17 | 242-244° C. | Difenoximide hydrochloride | (2,5-dioxopyrrolidin-1-yl) 1-(3-cyano-3,3-diphenylpropyl)-4-phenylpiperidine-4-carboxylate hydrochloride | 37800-79-6 |
| 18 | 242-244° C. | Levcromakalim | (3S,4R)-3-hydroxy-2,2-dimethyl-4-(2-oxopyrrolidin-1-yl)chroman-6-carbonitrile | 94535-50-9 |
| 19 | 242-243° C. | Bandrowski's base | 3,6-bis[(4-aminophenyl)imino]cyclohexa-1,4-diene-1,4-diamine | 20048-27-5 |
| 20 | 242° C. | pyrazino[2,3-f] quinoxaline | pyrazino[2,3-f]quinoxaline | 231-23-2 |
| 21 | 243-245° C. | 2,4,6-Tri-2-pyridinyl-1,3,5-triazine | 2,4,6-tri(pyridin-2-yl)-1,3,5-triazine | 3682-35-7 |
| 22 | 243-245° C. | 3,3',5,5'-Tetra-tert-butyl[di-2,5-cyclohexadien-1-ylidene]-4,4'-dione | 2,6-ditert-butyl-4-(3,5-ditert-butyl-4-oxo-1-cyclohexa-2,5-dienylidene)cyclohexa-2,5-dien-1-one | 2455-14-3 |
| 23 | 243-245° C. | 6-Methyl-8-nitrophenanthridine | 6-methyl-8-nitrophenanthridine | 51381-78-3 |
| 24 | 243-245° C. | 1,4-Dihydro-5H-tetrazol-5-one | 1,2-dihydrotetrazol-5-one | 16421-52-6 |
| 25 | 242.5-243° C. | 2,2'-Diamino-1,1'-binaphthyl | 1-(2-aminonaphthalen-1-yl)naphthalen-2-amine | 18741-85-0 |
| 26 | 243° C. (236-238°) | Violerythrin | 3,5,5-trimethyl-4-[(1E,3E,5E,7E,9E,11E,13E,15E,17E)-3,7,12,16-tetramethyl-18-(2,5,5-trimethyl-3,4-dioxo-1-cyclopentenyl)octadeca-1,3,5,7,9,11,13,15,17-nonaenyl]cyclopent-3-ene-1,2-dione | 22453-06-1 |
| 27 | 243-245° C. | Acenapthhenequinone | acenaphene-1,2-dione | 82-86-0 |
| 28 | 243° C. | Duryl aldehyde | 2,4,5-trimethylbenzaldehyde | 5779-72-6 |
| 29 | 244-245.5° C. | Longimammatine | 6-methoxy-1,2,3,4-tetrahydroisoquinoline | 42923-77-3 |
| 30 | 244-245° C. | Proguanil Hydrochloride | (1Z)-1-[amino-[(4-chlorophenyl)amino]methylidene]-2-propan-2-ylguanidine hydrochloride | 637-32-1 |
| 31 | 244-247° C. | 2H-1-Benzopyran-2-one, 5-hydroxy- | 5-hydroxychromen-2-one | 6093-67-0 |
| 32 | 244-245° C.; 251-252° C. | N,N'-Diphenylbenzidine | N-phenyl-4-[4-(phenylamino)phenyl]aniline | 531-91-9 |
| 33 | 244-245° C. | Methanone, bis(4-aminophenyl)- | bis(4-aminophenyl)methanone | 611-98-3 |
| 34 | 244° C. | Dapitant | (2S)-1-[(3aS,4S,7aS)-4-hydroxy-4-(2-methoxyphenyl)-7,7-di(phenyl)-1,3,3a,5,6,7a-hexahydroisoindol-2-yl]-2-(2-methoxyphenyl)propan-1-one | 153438-49-4 |
| 35 | 244-245° C. | Cytosinine | 3-amino-6-(4-amino-2-oxopyrimidin-1-yl)-3,6-dihydro-2H-pyran-2-carboxylic acid | 1860-84-0 |

TABLE 2-continued

| Example | Melting Point | Name | IUPAC Name | CAS Registry No. |
|---|---|---|---|---|
| 36 | 244-245° C. | Biurea | (carbamoylamino)urea | 110-21-4 |
| 37 | 244-245° C. | 9,10-Anthracenedicarboxaldehyde | anthracene-9,10-dicarbaldehyde | 7044-91-9 |
| 38 | 244-246° C. | Tri-3-indolylmethane | 3-[bis(1H-indol-3-yl)methyl]-1H-indole | 518-06-9 |
| 39 | 245° C. | 6-Benzyl-1,3,5-triazine-2,4-diamine | 6-(phenylmethyl)-1,3,5-triazine-2,4-diamine | 1853-88-9 |
| 40 | 245° C. | Taraxerone | (4aR,6aR,6aS,8aR,12aS,14aR,14bR)-4,4,6a,6a,8a,11,11,14b-octamethyl-2,4a,5,6,8,9,10,12,12a,13,14,14a-dodecahydro-1H-picen-3-one | 514-07-8 |
| 41 | 245-246° C. | 1,7-Dihydro-1,7-dimethyl-6H-purin-6-one | 1,7-dimethylpurin-6-one | 33155-83-8 |
| 42 | 245-246° C. | 1-Phenazinecarboxamide | phenazine-1-carboxamide | 550-89-0 |
| 43 | 245° C. | Methisazone | [(1-methyl-2-oxoindol-3-ylidene)amino]thiourea | 1910-68-5 |
| 44 | 245-247° C. | 3-Indazolinone | 1,2-dihydroindazol-3-one | 7364-25-2 |
| 45 | 245-246° C. | Emd 56431 | (3R,4S)-3-hydroxy-2,2-dimethyl-4-(2-oxopyridin-1-yl)chroman-6-carbonitrile | 123595-75-5 |
| 46 | 245-246.5° C. | Dimoxamine hydrochloride | 1-(2,5-dimethoxy-4-methylphenyl)butan-2-amine hydrochloride | 52663-86-2 |
| 47 | 245-247° C. | 9H-Carbazol-2-amine (9Cl) | 9H-carbazol-2-amine | 4539-51-9 |
| 48 | 245-247° C. | (1,2,4)Triazolo(4,3-a)pyridin-3(2H)-imine | [1,2,4]triazolo[4,5-a]pyridin-3-amine | 767-62-4 |
| 49 | 246-248° C. (239-240° C.) | Carbanilide | 1,3-di(phenyl)urea | 102-07-8 |
| 50 | 246-247° C. | 1H-1,2,3-Triazlo(4,5-c)pyridine | 2H-triazolo[4,5-c]pyridine | 273-05-2 |
| 51 | 246-248° C. | Hexamethylbenzene-alpha1,alpha4-diol | [4-(hydroxymethyl)-2,3,5,6-tetramethylphenyl]methanol | 7522-62-5 |
| 52 | 246-247° C. | 6-Thiocaffeine | 1,3,7-trimethyl-6-sulfanylidenepurin-2-one | 13182-58-6 |
| 53 | 246-249° C. | 1,2,3,4-Tetrahydro-9H-carbazole-9-carboxamide | 1,2,3,4-tetrahydrocarbazole-9-carboxamide | 67242-61-9 |
| 54 | 246-248° C. | 9,10-Diphenylanthracene | 9,10-di(phenyl)anthracene | 1499-10-1 |
| 55 | 246° C. | O 129 | 6,7-di(propan-2-yl)pteridine-2,4-diamine | 3810-29-5 |
| 56 | 246° C. | 9,9'-Bi-9H-fluorene | 9-(9H-fluoren-9-yl)-9H-fluorene | 1530-12-7 |
| 57 | 246-248° C. | 2-[4-(dicyanomethyl)phenyl]propanedinitrile | 2-[4-(dicyanomethyl)phenyl]propanedinitrile | 18643-56-6 |
| 58 | 247-248° C. | Sulfaquinoxaline | 4-amino-N-quinoxalin-2-ylbenzenesulfonamide | 59-40-5 |
| 59 | 247° C. | Metaldehyde | 2,4,6,8-tetramethyl-1,3,5,7-tetraoxocane | 108-62-3 |
| 60 | 247-250° C. | 1-Azaspiro(5.5)undecan-8-ol, 7-(1-buten-3-ynyl)-2-(4-pentynyl)-, (6R-(6alpha(R*),7beta(Z),8alpha))- | 7-[(E)-but-1-en-3-ynyl]-2-pent-4-ynyl-1-azaspiro[5.5]undecan-8-ol | 63983-63-1 |
| 61 | 247-249° C. | 9H-Pyrido(3,4-b)indole-3-carboxamide, N-ethyl- | N-ethyl-9H-pyrido[5,4-b]indole-3-carboxamide | 78538-80-4 |
| 62 | 247-248° C. | Apazone | 5-dimethylamino-9-methyl-2-propylpyrazolo[1,2-a][1,2,4]benzotriazine-1,3-dione | 13539-59-8 |
| 63 | 247-251° C. | 4,4',5,5'-Tetraphenyl-Δ²,²'-bi-2H-imidazole | N-[(4-carbamimidoylphenyl)methyl]-2-[5-chloro-3-(3-hydroxypropylamino)-2-oxo-6-phenylpyrazin-1-yl]acetamide | 14551-06-5 |
| 64 | 247° C. | 2-Hydroxy-3-phenylquinoxaline | 3-phenyl-1H-quinoxalin-2-one | 1504-78-5 |
| 65 | 247-249° C. | 3-Hydroxy-19-norpregna-1,3,5(10)-trien-20-one | 1-[(8S,9S,13S,14S,17S)-3-hydroxy-13-methyl-6,7,8,9,11,12,14,15,16,17-decahydrocyclopenta[a]phenanthren-17-yl]ethanone | 1667-98-7 |
| 66 | 248° C. | CP 93129 | 3-(1,2,3,6-tetrahydropyridin-4-yl)-1,4-dihydropyrrolo[2,3-e]pyridin-5-one | 127792-75-0 |
| 67 | 248° C. (238-299°) | 6-Benzyl-1,3,5-triazine-2,4-diamine | 6-(phenylmethyl)-1,3,5-triazine-2,4-diamine | 1853-88-9 |
| 68 | 248-250° C. | 6-Hydroxychrysene | chrysen-6-ol | 37515-51-8 |
| 69 | 248° C. | Tetraphenylpyrazine | 2,3,5,6-tetra(phenyl)pyrazine | 642-04-6 |
| 70 | 249-251° C. | 2,4,6-Pyrimidinetriamine | pyrimidine-2,4,6-triamine | 1004-38-2 |
| 71 | 249° C. | Pyrazino[2,3-b]quinoxaline | pyrazino[2,3-b]quinoxaline | 261-67-6 |

TABLE 2-continued

| Example | Melting Point | Name | IUPAC Name | CAS Registry No. |
|---|---|---|---|---|
| 72 | 249–250° C. | 6-Hydrazino-3-pyridazinecarboxamide | 6-hydrazinylpyridazine-3-carboxamide | 3614-47-9 |
| 73 | 249° C. | 4-Nitrophenylhydrazone | N-[(2-chlorophenyl)methylideneamino]-4-nitroaniline | 14295-17-1 |
| 74 | 249–253° C. | N$^1$,N$^4$-Di-E-cinnamoylputrescine | 3-phenyl-N-[4-(3-phenylprop-2-enoylamino)butyl]prop-2-enamide | 37946-56-8 |
| 75 | 249–250° C. | 1-Aminothioxanthen-9-one | 1-aminothioxanthen-9-one | 40021-31-6 |
| 76 | 249–250° C. | 1-Naphthylamine, 5-methoxy-1,2,3,4-tetrahydro-hydrochloride | (5-methoxy-1,2,3,4-tetrahydronaphthalen-1-yl)azanium chloride | 41566-70-5 |
| 77 | 250° C. | NCS404824 | 7H-[1,2,4]triazolo[5,1-f]purine | 4022-94-0 |
| 78 | 250–252° C. | 2,4-Quinazolinediamine | quinazoline-2,4-diamine | 1899-48-5 |
| 79 | 250° C. | Prioxodan | 3-methyl-6-(6-oxo-4,5-dihydro-1H-pyridazin-3-yl)-1,4-dihydroquinazolin-2-one | 111786-07-3 |
| 80 | 250° C. | 2,6-dimethylanthracene | 2,6-dimethylanthracene | 613-26-3 |
| 81 | 250° C. | 4,4'-Diaminoazobenzene | 4-(4-aminophenyl)diazenylaniline | 538-41-0 |
| 82 | 250–253° C. | N,N-Dimethyl-4-t-butylaniline | 4-tert-butyl-N,N-dimethylaniline | 2909-79-7 |
| 83 | 250–251° C. | Acetamide | N-chrysen-5-ylacetamide | 34441-00-4 |
| 84 | 230°; 250° C. | 1-Acridinol | 10H-acridin-1-one | 5464-73-3 |
| 85 | 251–252° C. | 2-Phenyl-1H-indole-3-carboxaldehyde | 2-phenyl-1H-indole-3-carbaldehyde | 25365-71-3 |
| 86 | 251° C. | Fluorene-9-carboxamide | 9H-fluorene-9-carboxamide | 7471-95-6 |
| 87 | 251–253° C. | 2,3-Dimethylcarbazole | 2,3-dimethyl-9H-carbazole | 18992-70-6 |
| 88 | 251–253° C. | 9,10-bis(2-phenylethynyl)anthracene | 9,10-bis(2-phenylethynyl)anthracene | 10075-85-1 |
| 89 | 251–253° C. | 6-Dimethyladenine | N,N-dimethyl-7H-purin-6-amine | 938-55-6 |
| 90 | 252–254° C. | 6-Quixoxalinol | 4H-quinoxalin-6-one | 7467-91-6 |
| 91 | 252–254° C. | Oxalanilide | N,N'-di(phenyl)oxamide | 620-81-5 |
| 92 | 252–255° C. | 3-(Hydroxyimino)-7-methylindolin-2-one | 3-(hydroxyamino)-7-methylindol-2-one | 13208-96-3 |
| 93 | 252° C. | 2,3-Dimethylanthracene | 2,3-dimethylanthracene | 613-06-9 |
| 94 | 252–255° C. | 2,4-Dinitrophenylhydrazone | 2,4-dinitro-N-[(2-phenylchroman-4-ylidene)amino]aniline | 16281-65-5 |
| 95 | 252–252.5° C. | Cyclopent(b)indol-3-one, 1,2,3,4-tetrahydro- | 2,4-dihydro-1H-cyclopenta[b]indol-3-one | 16244-15-8 |
| 96 | 253–254° C. | 1-Aminoanhraquinone | 1-aminoanthracene-9,10-dione | 82-45-1 |
| 97 | 253° C. | 2-Benzothiazolamine, 6-nitro- | 6-nitro-1,3-benzothiazol-2-amine | 6285-57-0 |
| 98 | 253° C. | 2H-1,3-Benzoxazine-2,4(3H)-dione, 2-thio- | 2-sulfanylidene-1,3-benzoxazin-4-one | 10021-35-9 |
| 99 | 254–255° C. | 7H-Pyrido(3,4-c)carbazole | 7H-pyrido[3,4-c]carbazole | 205-27-6 |
| 100 | 254–255° C. | Tetrahydroharmol hydrochloride | 1-methyl-2,3,4,9-tetrahydro-1H-pyrido[3,4-b]indol-7-ol hydrochloride | 17952-75-9 |
| 101 | 254–256° C. | Dibenz(a,h)anthracen-7-ol | naphtho[1,2-b]phenanthren-7-ol | 63041-68-9 |
| 102 | 254–256° C. (248–249°) | Glycosminine | 2-(phenylmethyl)-1H-quinazolin-4-one | 4765-56-4 |
| 103 | 254° C. | 2-Anthracenol (9Cl) | anthracen-ol | 613-14-9 |
| 104 | 254–256° C. | 4-Amino-5-cyanopyrimidine | 4-aminopyrimidine-5-carbonitrile | 16357-69-0 |
| 105 | 254° C.; (233°) | 2-Amino-4-nitrobenzothiazole | 4-nitro-1,3-benzothiazol-2-amine | 6973-51-9 |
| 106 | 255–256° C. (250–252°) | 2,4,6,8-Tetraphenyl-3,7-diazabicyclo [3.3.1]nonan-9-one | 2,4,6,8-tetra(phenyl)-3,7-diazabicyclo[3.3.1]nonan-9-one | 37123-09-4 |
| 107 | 255–257° C. | Tetrahydro-5,5-dimethyl-2(1H)-pyrimidinone | 5,5-dimethyl-1,3-diazinan-2-one | 17496-93-4 |
| 108 | 255° C. | Benzoic acid 2-(aminocarbonyl)hydrazide, 9Cl | (benzoylamino)urea | 2845-79-6 |
| 109 | 255–258° C. | 2,4,6-Quinazolinetriamine | quinazoline-2,4,6-triamine | 13741-90-7 |
| 110 | 255–256° C. | 3-Cyanothioxanthone | 9-oxothioxanthene-3-carbonitrile | 51762-90-4 |
| 111 | 255–256° C. | 6-Nitrobenzo[a]pyrene | 6-nitrobenzo[b]pyrene | 63041-90-7 |
| 112 | 255° C. | 3-Methyl-1,2,4-triazolo[4,3-a]pyrimidine | 3-methyl-[1,2,4]triazolo[4,5-a]pyrimidine | 65267-32-5 |
| 113 | 255° C. | 2-Methyl-4(5)-nitroimidazole | 2-methyl-4-nitro-3H-imidazole | 696-23-1 |
| 114 | 255–257° C. | 4-Hydroxy-2-phenylquinoline | 2-phenyl-1H-quinolin-4-one | 14802-18-7 |
| 115 | 255–256° C. | Halfordinol | 4-(2-pyridin-3-yl-1,3-oxazol-5-yl)phenol | 4210-82-6 |

TABLE 2-continued

| Example | Melting Point | Name | IUPAC Name | CAS Registry No. |
|---|---|---|---|---|
| 116 | 256-258° C. | Tetra-4-pyridinylthiophene | 4-[2,4,5-tri(pyridin-4-yl)thiophen-3-yl]pyridine | 64048-12-0 |
| 117 | 256-258° C. | Nifenazone | N-(1,5-dimethyl-3-oxo-2-phenylpyrazol-4-yl)pyridine-3-carboxamide | 2139-47-1 |
| 118 | 256-257° C. | Indisetron | N-(3,9-dimethyl-3,9-diazabicyclo[3.3.1]nonan-7-yl)-1H-indazole-3-carboxamide | 141549-75-9 |
| 119 | 256° C. (241-243°) | 1,2,3-Indanetrione | indene-1,2,3-trione | 938-24-9 |
| 120 | 256-258° C. | 1,4-dimethylquinoxaline-2,3-dione | 1,4-dimethylquinoxaline-2,3-dione | 58175-07-8 |
| 121 | 256-258° C. | 2-aminopyridin-1-ium-4-carboxamide | 2-aminopyridin-1-ium-4-carboxamide | 13538-42-6 |
| 122 | 257-258° C. | Terosite | 4-phenyl-2,6-bis(4-phenylpyridin-2-yl)pyridine | 24368-63-6 |
| 123 | 257° C. | Pentaphene | Pentaphene | 222-93-5 |
| 124 | 258-259° C. | Tetrahydrolathyrine | 2-amino-3-(2-amino-3,4,5,6-tetrahydropyrimidin-4-yl)propanoic acid | 72748-96-0 |
| 125 | 258-260° C. | Quinezamide | N-(5-methylpyrazolo[1,5-c]quinazolin-1-yl)acetamide | 77197-48-9 |
| 126 | 258° C. | 1,10-Phenanthroline-5,6-dione | 1,10-phenanthroline-5,6-dione | 27318-90-7 |
| 127 | 258° C. | 2-Nitrobenzimidazole | 2-nitro-1H-benzimidazole | 5709-67-1 |
| 128 | 258-259° C. | 1H-imidazo[5,4-b]pyrazine | 1H-imidazo[5,4-b]pyrazine | 273-94-9 |
| 129 | 258-260° C. | Magnosprengerine | 4-(2-dimethylaminoethyl)-2-methoxyphenol | 35266-63-8 |
| 130 | 258-259° C. | Dibenz(a,h)anthracen-6-ol | naphtho[4,3-b]phenanthren-13-ol | 83710-52-5 |
| 131 | 258-260° C. | 6-Amino-5,8-quinolinedione | 6-aminoquinoline-5,8-dione | 24149-57-3 |
| 132 | 259-260° C. | 7h-Pyrido[4,3-c]carbazole | 7H-pyrido[4,3-c]carbazole | 205-29-8 |
| 133 | 259° C. | 2-Methyl-9H-carbazole | 2-methyl-9H-carbazole | 3652-91-3 |
| 134 | 259-260° C. | 4,6-dimethyl-2-sulfanylidene-1H-pyridine-3-carbonitrile | 4,6-dimethyl-2-sulfanylidene-1H-pyridine-3-carbonitrile | 54585-47-6 |
| 135 | 259-261° C. | CV 399 | 4-methoxy-6-methyl-1,3,5-triazin-2-amine | 1668-54-8 |
| 136 | 259-260° C. | 6-(4-aminobutyl-ethylamino)-2,3-dihydro-1,4-phthalazinedione | 6-(4-aminobutyl-ethylamino)-2,3-dihydrophthalazine-1,4-dione | 66612-29-1 |
| 137 | 259-260° C. | 2-(1(2H)-Acenaphthylenylidene)-1(2H)-acenaphthylenone | 2-acenaphthen-1-ylideneacenaphthen-1-one | 477-77-0 |
| 138 | 260-261° C. | Diphenylene dioxide 2,3-quinone | oxanthrene-2,3-dione | 6859-47-8 |
| 139 | 260° C. | Benzo(a)pyrene-7,8-dione | benzo[a]pyrene-7,8-dione | 65199-11-3 |
| 140 | 260-265° C. | 2-Adamantanol | adamantan-2-ol | 700-57-2 |
| 141 | 260-263° C. | Friedelan-7-one | (4S,4aR,6aS,6aS,6bR,8aR,12aR,-14aS,14bR)-4,4a,6a,6b,8a,11,11,14a-octamethyl-2,3,4,5,6a,7,8,9,10,12,12a,13,-14,14b-tetradecahydro-1H-picen-6-one | 18671-54-0 |
| 142 | 260-261° C. | 1,2-Chrysenedione | chrysene-1,2-dione | 2304-83-8 |
| 143 | 260-262° C. | benzo[a]anthracene-5,6-dione | benzo[c]anthracene-5,6-dione | 18508-00-4 |
| 144 | 260° C. | Pentaerythritol | 2,2-bis(hydroxymethyl)propane-1,3-diol | 115-77-5 |
| 145 | 260-265° C. | 1-Methylcytosine | 4-amino-1-methylpyrimidin-2-one | 1122-47-0 |
| 146 | 260° C. (297-299°) | 2,8-Dihydroxyquinoline | 8-hydroxy-1H-quinolin-2-one | 15450-76-7 |
| 147 | 260-262° C. | N(beta)-Alanyl-1-methyl-histidine | 3-aminopropanoyl (2S)-2-amino-3-(1-methylimidazol-4-yl)propanoate | 331-38-4 |
| 148 | 261-263° C. | Sporidesmolide I | 4,19-dimethyl-3,12-bis(2-methylpropyl)-6,9,15-tri(propan-2yl)-1,10-dioxa 4,7,13,16-tetrazacycloicosane-2,5,8,11,14,17-hexone | 2900-38-1 |
| 149 | 261-264° C. | Picodralazine | [4-(pyridin-4-ylmethyl)phthalazin-1-yl]hydrazine | 17692-43-2 |

TABLE 2-continued

| Example | Melting Point | Name | IUPAC Name | CAS Registry No. |
|---|---|---|---|---|
| 150 | 261-262° C. | 8-Phenyl-1H-purine | 8-phenyl-7H-purine | 4776-14-1 |
| 151 | 261° C. | Furagin | 1-[[(E)-3-(5-nitrofuran-2-yl)prop-2-enylidene]amino]imidazolidine-2,4-dione | 1672-88-4 |
| 152 | 261° C. | 4,8-Dibenzoyl-5-methoxy-1-naphthalenol | 2-(piperidin-1-ylmethyl)-10,10a-dihydro-5H-imidazo[1,5-b]isoquinoline-1,3-dione | 372520-17-7 |
| 153 | 261-262° C. | beta-Carboline-3-carboxylic acid methyl ester | methyl 9H-pyrido[5,4-b]indole-3-carboxylate | 69954-48-9 |
| 154 | 261° C. | 1,4-Bis(2-benzothiazolyl)benzene | 2-methyl-N'-(2-oxoindol-3-yl)benzohydrazide | 5153-65-1 |
| 155 | 261° C. | 12H-[1]Benzopyrano[2,3-b]quinoxalin-12-one | chromeno[3,2-b]quinoxalin-12-one | 82501-03-9 |
| 156 | 261-262° C. | Indeno(1,2-c)isochromene-5,11-dione | indeno[3,2-c]isochromene-5,11-dione | 5651-60-5 |
| 157 | 261-263° C. (254-258°) 213.5-214° (210-212°) | Benzene-1,3,5-tricarbonitrile | benzene-1,3,5-tricarbonitrile | 10365-94-3 |
| 158 | 262-263° C. | Guanazine | 1,2,4-triazole-3,4,5-triamine | 473-96-1 |
| 159 | 262° C. | Razobazam | 3,8-dimethyl-4-phenyl-2H-pyrazolo[3,4-b][1,4]diazepine-5,7-dione | 78466-98-5 |
| 160 | 262° C. | 1-Phenylbarbituric acid | 1-phenyl-1,3-diazinane-2,4,6-trione | 15018-50-5 |
| 161 | 262-263° C. | 6-Methoxypurine | 6-methoxy-7H-purine | 1074-89-1 |
| 162 | 262° C. (283-286°) | N-(4-chloro-2-nitrophenyl)thiophene-2-carboxamide | N-(4-chloro-2-nitrophenyl)thiophene-2-carboxamide | 5356-56-9 |
| 163 | 262-262.5° C. | 9H-Fluorene-4-carboxylic acid, 7-nitro-9-oxo- | 7-nitro-9-oxofluorene-4-carboxylic acid | 42523-38-6 |
| 164 | 262° C. | 4-Nitroacridone | 4-nitro-10H-acridin-9-one | 4261-62-5 |
| 165 | 262-264° C. | Papyriogenin A | (4aR,6aR,6aS,6bR,8aR,12aS)-2,2,6a,6b,9,9,12a-heptamethyl-3,10-dioxo-1,4,5,6,6a,7,8,8a,11,12-decahydropicene-4a-carboxylic acid | 59076-79-8 |
| 166 | 262-264° C. | N-[(1R,3S)-3-acetamidocyclohexyl]acetamide | N-[(1R,3S)-3-acetamidocyclohexyl]acetamide | 32189-20-1 |
| 167 | 262-263° C. | 1,3-Di-p-tolylurea | 1,3-bis(4-methylphenyl)urea | 621-00-1 |
| 168 | 263-265° C. | 1,1,3,3-Propanetetracarboxamide | propane-1,1,3,3-tetracarboxamide | 10550-79-5 |
| 169 | 263° C. | 5-Hydroxy-4-methyl-2H-1-benzopyran-2-one | 5-hydroxy-4-methylchromen-2-one | 2373-34-4 |
| 170 | 263-264° C. | 1,3-Dihydro-5-methoxy-2H-benzimidazole-2-thione | 5-methoxy-1,3-dihydrobenzimidazole-2-thione | 37052-78-1 |
| 171 | 263° C. (288-290°) (294-296°) | 9,10-Dinitroanthracene | 9,10-dinitroanthracene | 33685-60-8 |
| 172 | 263-270° C. | Mdl 74366 | [2-(2-dimethylaminoethyl)-2,5,7,8-tetramethylchroman-6-yl] acetate hydrochloride | 128008-98-0 |
| 173 | 263-264° C. | Dibenz(a,h)anthracen-5-ol | naphtho[4,3-b]phenanthren-12-ol | 4002-76-0 |
| 174 | 263-265° C. | Paxillarine A | [(4R,8R,10R,13S,17S)-3-(benzoyl-methylamino)-17-(1-dimethylaminoethyl)-16-hydroxy-10,13-dimethyl-2,3,4,5,6,7,8,9,11,12,14,15,16,-17-tetradecahydro-1H-cyclopenta[a]phenanthren-4-yl] acetate | 145022-89-5 |
| 175 | 263-267° C. | N-Deacetyl-3-demethyl-N-formylcolchicine | N-(3-hydroxy-1,2,10-trimethoxy-9-oxo-6,7-dihydro 5H-benzo[d]heptalen-7-yl)formamide | 18172-26-4 |
| 176 | 263-264° C. | N-[(2S,4aR,6S,7R,8R,8aS)-8-hydroxy-2-phenyl-6-(phenylmethoxy)-4,4a,6,7,8,8a-hexahydropyrano[5,6-d][1,3]dioxin-7-yl]acetamide | N-[(2S,4aR,6S,7R,8R,8aS)-8-hydroxy-2-phenyl-6-(phenylmethoxy)-4,4a,6,7,8,8a-hexahydropyrano[5,6-d][1,3]dioxin-7-yl]acetamide | 13343-63-0 |
| 177 | 263° C. | 7-Amino-5,8-quinolinedione | 7-aminoquinoline-5,8-dione | 64636-91-5 |
| 178 | 263-264° C. | 9-Acridinecarboxamide | acridine-9-carboxamide | 35417-96-0 |

TABLE 2-continued

| Example | Melting Point | Name | IUPAC Name | CAS Registry No. |
|---|---|---|---|---|
| 179 | 264° C. (268°) | Theophylline | 1,3-dimethyl-7H-purine-2,6-dione | 58-55-9 |
| 180 | 264-265° C. | Siguazodan | 3-cyano-2-methyl-1-[4-(4-methyl-6-oxo-4,5-dihydro-1H-pyridazin-3-yl)phenyl]guanidine | 115344-47-3 |
| 181 | 264° C. | 4-nitro-N-(pyridin-2-ylmethylideneamino)aniline | 4-nitro-N-(pyridin-2-ylmethylideneamino)aniline | 70421-66-8 |
| 182 | 264-266° C. | 3-(Hydroxyamino)-1H-isoindol-1-one | 3-(hydroxyamino)isoindol-1-one | 29833-90-7 |
| 183 | 264° C. | 2,3-Diaminophenazine | phenazine-1,2-diamine | 655-86-7 |
| 184 | 264-265° C. | Harmine | 7-methoxy-1-methyl-9H-pyrido[3,4-b]indole | 442-51-3 |
| 185 | 264-265° C. | 2-Hydroxyisophenoxazin-3-one | 10H-phenoxazine-2,3-dione | 1915-49-7 |
| 186 | 264-265° C. | 3-Hydroxyestra-1,3,5(10),6-tetraen-17-one | (8R,9S,13S,14S)-3-hydroxy-13-methyl-9,11,12,14,15,16-hexahydro-8H-cyclopenta[a]phenanthren-17-one | 2208-12-0 |
| 187 | 264-268° C. | 21-Hydroxyfriedelan-3-one | (4R,4aS,6aS,6aS,6bR,8aS,10R,12aR,14aS,14bS)-10-hydroxy-4,4a,6a,6b,8a,11,11,14a-octamethyl-2,4,5,6,6a,7,8,9,10,12,12a,13,14,14b-tetradecahydro-1H-picen-3-one | 59995-80-1 |
| 188 | 264-266° C. | 9-octyl-3H-purine-6-thione | 9-octyl-3H-purine-6-thione | 60632-18-0 |
| 189 | 265° C. | 3,4,5-tri(phenyl)-1H-pyrazole | 3,4,5-tri(phenyl)-1H-pyrazole | 18076-30-7 |
| 190 | 265-268° C. | Spirobishexahydropyrimidine | 4,4,10,10-tetramethyl-1,3,7,9-tetrazaspiro[5.5]undecane-2,8-dione | 4115-66-6 |
| 191 | 265-267° C. | 1,2,3,4-tetrahydroacridine-9-carboxamide | 1,2,3,4-tetrahydroacridine-9-carboxamide | 42878-53-5 |
| 192 | 265-266° C. | 1H-Pyrrolo(2,3-d)pyrimidine-2,4(3H,7H)-dione, 1,3,7-trimethyl- | 1,3,7-trimethylpyrrolo[3,2-e]pyrimidine-2,4-dione | 39930-51-3 |
| 193 | 265° C. | 4-(4-carbamoylphenoxy)benzamide | 4-(4-carbamoylphenoxy)benzamide | 6336-34-1 |
| 194 | 265-266° C. | 4,4'-Iminobisbenzonitrile | 4-[(4-cyanophenyl)amino]benzonitrile | 36602-05-8 |
| 195 | 265-266° C. | 1,10-Phenanthroline, 5,6-dimethyl- | 5,6-dimethyl-1,10-phenanthroline | 3002-81-1 |
| 196 | 265-267° C. | 4H-1-Benzopyran-4-one, 7-hydroxy-2-(4-methoxyphenyl)- | 7-hydroxy-2-(4-methoxyphenyl)chromen-4-one | 487-24-1 |
| 197 | 265° C. | 1,4,6-triaminopyrimidine-2-thione | 1,4,6-triaminopyrimidine-2-thione | 4765-63-3 |
| 198 | 265° C. | 9,10-Anthracenedione, 1,8-diamino- | 1,8-diaminoanthracene-9,10-dione | 129-42-0 |
| 199 | 265° C. | 2-hydroxy-1H-benz[de]isoquinoline-1,3(2H)N-dione, 9Cl; Naphthalhydroxyamic acid | | 5690-46-0 |
| 200 | 265° C. | 3-aminoquinoxaline-2-carboxamide Amide derivative | | 67568-30-3 |
| 201 | 265° C. | 6-Nitro-2-quinolinamine | | 49609-07-6 |
| 202 | 265° C. | 2-aminonaphtho[2,1d] thiazole (N—Ac form) | | 54380-14-2 |
| 203 | 265° C. | hernandonine, deriv 3-methoxy | | 155944-22-2 |
| 204 | 265° C. | 3-hydroxy-6-methylisoquinoline | | 51463-11-7 |
| 205 | 265° C. | hexahydro-1,2,4-ethanylylidene-1H-cyclobuta[cd]pentalene-3,5,7-trione | | 110243-21-5 |
| 206 | 265° C. | 2,6-anthracenediol, di-Ac form | | 13979-53-8 |
| 207 | 265° C. | 1H,9H-pyrrolo[3,2-b][1,4]benzoxazin-2(3H)-one | | 147345-48-0 |
| 208 | 265° C. | Histidine phenylalanine anhydride (−)-cis-form | | 56586-95-9 |
| 209 | 265° C. | 2,4,5,6,7-pentamethyl-1H-benzimidazole | | 69700-34-1 |
| 210 | 265° C. | 3-[2-(4-pyridinyl)ethenyl]-1H-indole (E)-form | | 53645-38-8 |

TABLE 2-continued

| Example | Melting Point | Name | IUPAC Name | CAS Registry No. |
|---|---|---|---|---|
| 211 | 265° C. | 9-aminofluorene (N—Ac form) | | 5424-77-1 |
| 212 | 265° C. | pyrido[2,3-b]pyrazine-2,3-diol (derivative 3-Et ether) | $C_7H_5N_3O_2$/c11-6-7(12)10-5-4(9-6)2-1-3-8-5/h1-3H,(H,9,11)(H,8,10,12) | 2067-84-7 |
| 213 | 265° C. | diamide derivative ($C_8H_8N_2S_2$) | | 13363-51-4 |
| 214 | 265° C. | 2,4-dinitrophenylhydrazone (derivative of 1-(1H-inden-6-yl)ethanone chloride | | Not Available |
| 215 | 265° C. | Tricarbazyl 3-(9-Carbazoly1)-9,9' dicarbazole | | 6515-02-2 |

In certain aspects, the one or more organic compounds or chemicals are processed to minimize evaporative loss, enhance crystallinity, and to obtain high purity levels. The one or more organic compounds are processed into compacted shapes, such as pellets or grains, by application of pressure in a die or mold, by way of example. The structural integrity of pellets is desirably sufficient to withstand compressive forces of the HTTCO device, for example to withstand the applied force and bias to the HTTCO springs and encasement in a HTTCO assembly. The unique ability of HTTCOs to maintain physical rigidity and spring compression and therefore maintain electrical continuity at TCO operating temperatures in a high temperature device, yet further having the ability to physically transition and open the circuit at a rated threshold temperature is an important feature of the high-temperature thermal pellet compositions of the present teachings. By way of example, as noted previously, certain HTTCOs are capable of withstanding extended exposure to operating temperatures up to about 5° C. below the threshold or actuation temperature without breaking the electrical continuity of the circuit.

The high temperature thermal pellet compositions can be manufactured into any commercially available form suitable for use inside a housing of a TCO, including granules, pellets, spheres and any geometric shape known to those in the art. In addition to the above described organic compounds, the high temperature thermal cutoff pellet compositions of the present disclosure may optionally include one or more components selected from the group consisting of: a binder, a press aid, a release agent, a pigment, or mixtures thereof. The binder component, which generally softens (melts) at a temperature below the melting point of the organic component, is primarily utilized to assist in the production of pellets. While various binders known for pellet formation can be utilized, suitable binders include polyethylene glycol, 1,3-benzenediol, epoxies, polyamides and mixtures thereof. The binder is generally present in amounts up to about 10 wt. % based on the total composition.

Additionally, it may be desirable to employ a lubricant or pressing aid to aid in flowing and fill properties when processing the thermal pellets. For example, among the numerous lubricants or press aids which have proven useful are calcium stearate, boron nitride, magnesium silicate and polytetrafluoroethylene (Teflon®), among others. The lubricant is generally present in an amount up to about 5 wt. % based on the total pellet composition. It may also be desirable under certain applications to incorporate coloring agents such as pigments into the thermal cutoff composition to allow for rapid visual inspection of the pellets condition. Virtually any known pigment which is compatible with the aforementioned thermal cutoff composition components may be employed. Pigments, when employed, are typically present in an amount up to about 2 wt. % of the pellet composition.

In certain embodiments, the pellet composition may consist essentially of a single organic composition as the primary ingredient to arrive at a transition temperature of greater than or equal to about 240° C., and optionally a binder, optionally a press aid, optionally a release agent, and/or optionally a pigment. Such a pellet composition may comprise minimal amount of diluents or impurities that do not substantially affect the transition temperature of the pellet composition or the performance of the HTTCO at operating temperatures above the threshold temperature.

Initially, a first high-temperature thermal pellet sample can be prepared with the objective of obtaining a product having an expected transition temperature (e.g., melting point temperature or melt transition temperature) of about 240° C. The sample is processed to enhance the crystallinity and then prepared by mixing between about 90% to about 100% by weight of chemical either alone or with 10% to about 0.25% by weight of additives such as binders in a hammermill mixer. Added to the aforementioned organic compounds may be 5% to 0.25% by weight of a binders, such as polyamide binder, among others and 1% to 0.05% by weight of an organic azo pigment. The resulting composition exhibits a transition temperature/melting point temperature of about 236° C.

Additional samples can be prepared to make a HTTCO product having a melting point temperature of about 257° C. In this regard, the sample is processed to enhance the crystallinity and then prepared by mixing between about 90% to about 100% by weight of chemical either alone or with 10% to about 0.25% by weight of additives, such as binders, in a hammermill mixer. Added to the aforementioned organic compounds may be 5% to 0.25% by weight of binders, such as polyamide binder, among others and 1% to 0.05% by weight of an organic azo pigment. After blending to homogenize the constituent components, the sample may be analyzed using differential scanning calorimetry (DSC). The resulting composition has a transition temperature/melting point temperature of about 257° C.

In addition to exhibiting repeatable transition temperatures, the high-temperature thermal cutoff compositions of the present disclosure are also expected to exhibit clean current interrupt properties, decreased material and processing costs, and should have flexibility to permit customized design of predetermined thermal cutoffs to specific customer needs. In certain aspects, high melting point organic compositions can be formulated by use of computer software to calculate melting points of organic compounds for example, such as the computer program sold under the tradename PROMA2000®, manufactured by Daijin Technologies Corp. South Korea.

Furthermore, the transition temperatures/melting points of the various compositions to be used in the thermal cutoff composition in the present disclosure can be measured using ThermoGravimetric Analyzers coupled with and without Mass Spectrometer (TGA-MS), differential scanning colorimetry (DSC) and differential thermal analysis (DTA), by way of example. Devices for performing these qualitative and quantitative assays are commercially available, for example, from TA Instruments, New Castle, Del. USA, Model Q2000 (DSC), and Mettler STARe ThermoGravimetric Analyzer, TGA/sDTA851e, coupled to a Balzers ThermoStar Mass Spectrometer from Mettler-Toledo, Columbus, Ohio. Further, the compositions of the present teachings can be quantitatively analyzed using known techniques such as proton or carbon nuclear magnetic resonance, mass spectroscopy or Fourier transform infrared spectroscopy techniques, by way of non-limiting example.

High-Temperature Sealants

In various embodiments of the present invention, the high temperature TCO device comprises a high-temperature sealant system that is used over one of more openings in the housing to provide a barrier between the interior of the HTTCO and the external atmosphere. In various aspects, the high temperature sealant system or seal is robust, reliable, and maintains integrity as high operating temperatures of the HTTCO device. The seal is an important aspect of the reliability and longevity of the HTTCO device, in that selection of an appropriate seal material provides a barrier that maintains chemical equilibrium inside the HTTCO, even at the high operating temperatures of the HTTCO and prevents substantial loss of the pellet materials through the seal or barrier.

Thus, in various aspects, the seal material system provides a strong sealing mechanism over one or more openings in the housing to prevent undesirable thermal pellet sublimation, and thus, loss of pellet material. In certain aspects, the reliability of the HTTCO sealing system can be related to the lifespan of the HTTCO device, where a predetermined life span is at least 1,000 hours or longer at 235° C. (reflecting the operating temperatures of about 5° C. than the threshold rating temperature of 240° C.).

In certain aspects, the high-temperature seal system is an epoxy-based system that is cured to provide a durable, high-temperature, strong sealing mechanism. One particularly suitable high temperature resistant epoxy system is formed from precursors comprising one or more diglycidyl ether of bisphenol A resins, which are combined with a hardener, for example a modified imidazole hardener or epichlorhydrin.

In various embodiments, the epoxy systems of the present invention are generally prepared in accordance with the manufacturer's recommendations. In certain embodiments, the epoxy systems are prepared in a modified manner to facilitate curing of the epoxy system in a manner that produces a strong mechanical seal between the HTTCO components (both metal and ceramic), which can withstand temperatures above about 235° C., optionally above about 240° C., optionally above about 245° C., optionally above about 250° C., optionally above about 260° C., optionally above about 265° C., optionally above about 270° C., optionally above about 275° C., optionally above about 280° C., optionally above about 285° C., optionally above about 290° C., and in certain aspects, optionally up to about 300° C., in a manner capable of retaining a stable thermal pellet composition and preventing substantial sublimation of the thermal pellet composition. In some embodiments, the epoxy systems of the present invention are cured to B-stage and/or full advanced or accelerated cure stage at various temperatures and relative humidity suitable to create the desired barrier seal. In certain aspects, the B-stage epoxy cure is a low temperature cure typically performed at less than or equal to about 60° C. at various relative humidities ranging from about 0% to about 85%, optionally at about 0 to about 75%, optionally about 0 to about 50%, optionally about 0 to about 40%, and in certain aspects about 0 to about 35%. A polymer seal is generally considered to be B-stage cured when the seal has a hardness shown by impression of a permanent indent mark at Shore Durometer 75. Thus, in certain aspects, the curing is conducted to achieve a hardness of at least Shore D 75. In certain embodiments, an accelerated or advanced cure is conducted after B-stage curing of the HTTCO device at an elevated temperature, for example from about 150° C. to about 175° C. for 3 to 5 hours, by way of example.

Many commercially available epoxy-based systems include at least two to three curable precursors that are mixed together and then cured to form a polymer. In certain embodiments, one suitable high-temperature epoxy-based sealant system to form a seal in the HTTCO comprises precursors comprising a diglycidyl ether bisphenol A resin and a hardener. In certain aspects, such a hardener comprises a modified imidazole compound. In certain embodiments, the hardener comprises a 2-ethyl-4-methyl-1H-imidazole. In certain embodiments, the epoxy-based sealant is formed by combining at least two epoxy precursors, where a first precursor comprises at least one epoxy resin, such as a bisphenol A diglycidyl ether, an elastomer polymer, and neopentyl glycol diglycidyl ether; and a second precursor comprises 2-ethyl-4-methyl-1H-imidazole as the hardener. By way of example, a commercially available diglycidyl ether of bisphenol A and modified imidazole hardener system is commercially available from Henkel Loctite as the following: Loctite® Hysol® 210210 Epoxy Resin Part A (Item No. 36745), Loctite® Hysol® 210211; Epoxy Hardener Part B (Item No. 36746); and Loctite® Hysol® 210209 Epoxy Pigment (Item No. 36745) (this combined epoxy system is referred to as "C5 epoxy"). Loctite® Hysol® 210210 Epoxy Resin Part A contains about 60-100% by weight of a first proprietary epoxy resin, which is believed to be a modified bisphenol A diglycidyl ether epoxy resin 10-30% of a second proprietary epoxy resin, which is also believed to be a modified bisphenol A diglycidyl ether, 10-30% of neopentyl glycol diglycidyl ether (CAS No. 17557-23-2); 5-10% of a proprietary elastomer, 1-5% titanium dioxide pigment, and 1-5% amorphous fumed silica. Loctite® Hysol® 210211 Epoxy Resin Part B contains 60-100% by weight of a proprietary modified imidazole, which is believed to be 2-ethyl-4-methyl-1H-imidazole. Loctite® Hysol® 210209 Epoxy Resin Part C contains 30-60% by weight titanium dioxide, 10-30% of a first proprietary epoxy resin, which is believed to be a modified bisphenol A diglycidyl ether epoxy resin, 10-30% of a second proprietary epoxy resin, which is also believed to be a modified bisphenol A diglycidyl ether epoxy, 1-5% neopentyl glycol diglycidyl ether, 1-5% alkyl glycidyl ether, 1-5% aluminum oxide, 1-5% fumed amorphous silica, and lastly 1-5% of a proprietary elastomeric polymer.

In preparing the C5 epoxy, 80-100 parts by weight of the resin Part A is mixed with 0-20 parts by weight for the hardener Part B. Part C is optional and can be added at 0-20 parts by weight to form the final C5 epoxy to be applied to the TCO components for sealing the device containing the thermal pellet composition.

In yet another embodiment, an epoxy-based sealant is formed by combining at least two precursors, wherein a first precursor comprises an epoxy resin or bisphenol A diglycidyl ether polymer; a second precursor comprises a hardener or curing agent, such as 1-(2-cyanoethyl)-2-ethyl-4-methyl imidazole; and a third precursor comprises catalysts including benzenetetracarboxylic-1,2,4,5-dianhydride, hexahydrophthalic anhydride, and phthalic anhydride.

After the curable epoxy-based material has been applied to seal the TCO components to seal one or more openings (such as shown in FIGS. 1-2), the epoxy-based sealant system is optionally cured. Curing can be conducted by any means known in the art, including by application of heat, actinic radiation, and the like. In certain aspects, the epoxy sealant materials are subjected to a B-stage cure, where the epoxy system is heated to a temperature range of about 45° C. to about 65° C. in a controlled atmosphere having relative humidity ranging from 0% to 80%. Optionally, a full advanced cure can be conducted after B-stage curing. An advanced cure is optionally conducted at a temperature range of about 150° C. to about 200° C. in a controlled atmosphere having relative humidity ranging from 0% to 5%. In certain aspects, the C5 epoxy seal material is cured by placing the HTTCO device in an oven and heating the TCO at 248° C. for about 3 to about 9 hours at 0% relative humidity.

In certain other embodiments, the HTTCOs can be sealed with a suitable epoxy-based system commercially available from Emerson & Cuming Corp., Billerica, Mass. USA, which is a bisphenol A diglycidyl ether polymer (Part A); an epichlorohydrin hardener (Part B); and a catalyst (Part C) sold under the trade name Stycast® W 66 epoxy system (herein referred to as the "W66 epoxy system"). Specifically, the W66 epoxy system includes Part A comprising Bisphenol A diglycidyl ether polymer having an average molecular weight of less than 700 at 100 wt. %, Part B comprising 1-(2-cyanoethyle)-2-ethyl-4-methyl Imidazole hardener at greater than 99 wt. % in less than 0.1% acrylonitrile carrier. Part C of the W66 comprises a catalyst of Benzenetetracarboxylic-1,2,4,5-Dianhydride (35-50% by weight), Hexahydrophthalic anhydride (35-50% by weight) and phthalic anhydride (1-5% by weight).

In preparing the W66 epoxy, part A in an amount ranging from 50% to about 80% by weight is mixed with part B in an amount ranging from 50% to about 20% by weight and mixed. Once the W66 epoxy system has been applied to seal the HTTCO components, the W66 epoxy is optionally cured to a B-stage and/or advanced cure. By way of non-limiting example, the W66 seal system is applied and cured by placing the device in a controlled atmosphere and heating the TCO at 40° C. for about 48 to about 96 hours at 35% to 85% relative humidity.

Example 1

In accordance with various aspects of the present disclosure, a high temperature TCO device is formed as follows. A pellet is formed by mixing 980 g to 1000 g of triptycene (commercially available from Sigma-Aldrich manufacturer at 95% to 99% purity) with 20 g to 0.5 g of colorants, binders, and or release agents. The homogenized mixture is processed on a standard powder compaction press widely available from pharmaceutical equipment suppliers. The powder is fed through a gated powder flow control system and spread evenly over a rotary die table. The powder fills the dies and punches press the powder in the dies under approximately 1 ton to 4 tons pressure to form a compacted powder pellet having a density of 29 pellets per gram to 50 pellets per gram. The pellet is placed into a high-conductivity metal, closed-end cylinder with an inner diameter approximately the outer diameter of the TCO pellet. The closed end of the cylinder is staked shut with an axial conductive metal lead protruding out of the cylinder. Other components are loaded atop the pellet in a stacked fashion depending on the end-use requirements of the TCO. A sub-assembly comprised of a non-conductive ceramic bushing with an axial bore hole and a conductive metal lead which has been inserted in the open bore and mechanically restrained into a permanent one-piece assembly by deformation of the metal lead is inserted into the open end of the TCO cylinder. The stacked components noted earlier in paragraph 0018 are compressed into the cylinder by the ceramic, isolated lead assembly and the rim of the open end of the cylinder is mechanically rolled over the ceramic bushing to permanently enclose the internal components in the TCO cylinder. The closed TCO is then sealed with a high temperature, epoxy sealant. An epoxy-based sealant is prepared at 25° C. to seal the bushing and isolated lead and rolled over cylinder edge exterior terminal region of the TCO housing by mixing 200 g of LOCTITE® HYSOL® 210210 Epoxy resin Part A (an epoxy resin comprising bisphenol A and diglycidyl ether); 14 g of LOCTITE® HYSOL® 210211 Epoxy hardener Part B (an imidazole hardener); and optionally 13.2 g of LOCTITE® HYSOL® 210209 Epoxy pigment Part C (epoxy resins, neopentyl glycol diglycidyl ether, pigment, . . . ) or an additional 13.2 g of LOCTITE® HYSOL® 210210 Epoxy resin Part A in a sealed paddle mixer at 100 RPM for 10 minutes under vacuum to 30 mmHg to form a uniform epoxy mixture. The reagents are mixed for a total of 1.5 minutes to 5 minutes with a 10 minute no-mix vacuum step at the end of the mechanical mix to form a single component matrix mixture. The epoxy mixture is applied over the bushing and isolated lead to cover down to the rolled over cylinder rim of the TCO device using epoxy dispenser bottles with narrow tips or mechanical application equipment to ensure even coverage.

The assembled TCO having the epoxy sealing compound applied is then cured for 9 hours at 48° C. to 60° C. under 0% RH to 85%. The B-staged TCO assemblies are then cured in a controlled over at a temperature of 150° C. optionally up to 235° C. in 0% RH to 35% RH for 3 hours up to 6 hours.

The C5 epoxy system is studied to demonstrate the high-temperature performance of the sealant system, as well as the ability to retain polycyclic organic compounds of the pellet of the HTTCO device. Specifically, the high-temperature thermal pellet contained triptycene and a polytetrafluoroethylene release agent, which was retained by the C5 epoxy seal during continuous exposure to 247° C. A thermal pellet formed of a smaller molecule pentaerythritol (CAS No. 115-77-5) having a melting point beginning at 259° C. was not retained in a TCO using the C5 sealing system during continuous exposure to 247° C. The melting points of the two pellet organic compounds, triptycene and pentaerythritol are similar, and, are known to have similar volatile evolution behavior. However, the C5 sealing system is able to retain the triptycene inside the sealed HTTCO housing significantly better than the pentaerythritol.

The pellet height of the pentaerythritol at Day 1 goes from an initial pellet height of 101 thousandths of an inch to 0.00 thousandths of an inch. Thus, TCOs having the pentaerythritol open continuity or exhibited resistance greater than 200 kOhm (actuate) almost immediately. The HTTCO having a pellet containing triptycene has an initial pellet height of about 98 thousandths of an inch and retains at least 80 thousandths of an inch pellet height for at least 13 weeks and does not exhibit resistance of greater than 200 kOhm until over 2,100 hours of performance for 9 out of 10 HTTCO samples.

Given that the compounds melting points and their volatility onset by TGA are nearly identical, the difference in retention is believed to be attributed to functionality or size of the molecule, or a combination of both. Using a simple computer model, the sizes (radii) of the compounds are calculated. As noted in Table 3, below, triptycene has a radius of 0.46 nm while pentaerythritol has a radius of 0.33 nm. Also, the triptycene molecule is fairly rigid given the steric hindrance of the three benzene rings. When viewed along the end of the molecule, the 3 benzene molecules separate at 120° from each other for maximum spacing. On the other hand, the pentaerythritol has significantly more molecular freedom to twist and reorient itself. The triptycene has little functionality other than the double bonds present in the aromatic ring. However, the aromatic rings have the ability to pi-pi stack with other aromatic rings in the epoxy structure, which could immobilize them in the pores thus blocking the pore. The pentaerythritol has four polar hydroxyl bonds that have hydrogen bond accepting/donating capability.

as the pentaerythritol and triptycene, so once again the size and functionality are examined to provide insight into the interaction of the organic compound with the cured epoxy seal material. The 1-aminoanthraquinone molecule lies in a single plane and is a rigid molecule due to the benzene rings and the carbonyl bonds that bond them together—all of which require planar orientation. The radius of the 1-aminoanthraquinone is 0.45 nm, which is similar in size to the triptycene. However, the 1-aminoanthraquinone has the added advantage of having more functionality present with which to interact with the epoxy seal material. The carbonyl bonds can accept hydrogen donation and the amine group can hydrogen donate/accept. Based on its steric similarity to triptycene and its functionality similarity to pentaerythritol, 1-aminoanthraquinone has even greater retention by the epoxy seal that the triptycene or pentaerythritol.

Specimens of the C5 system are produced by reacting the components at temperatures and humidities listed below. All specimens are exposed to the same temperature programming for B-staged and advanced cure levels. B-staged specimens are heated at 48° C. for 5 hours and then at 58° C. for 4 hours. The B-staging is performed in two different relative humidity environments (0% and 35% RH) to determine the effect of water on the B-stage curing. Specimens exposed to 35% RH are B-staged in a humidity chamber that maintains the humidity at 35% while following the temperature program. Specimens prepared in 0% RH are B-staged in an oven. To achieve 0% RH, a compressed air source with two water traps is employed to ensure that no water is exposed to the epoxy system during B-staging. Some specimens required advanced curing, which entailed heating the B-staged specimens to 150° C. for 3 hours. The humidity is

TABLE 3

| | Compound | |
|---|---|---|
| | triptycene | pentaerythritol |
| CAS # | 477-75-8 | 115-77-5 |
| Other Names | Triptycene; 9,10-o-Benzenoanthracene, 9,10-dihydro-; Tribenzobicyclo[2.2.2]octatriene; Tryptycene; Anthracene, 9,10-dihydro-9,10-O-benzeno- | Methane tetramethylol; Pentaerythrital; Tetrahydroxymethylmethane; Tetrakis(Hydroxymethyl)methane; Tetramethylolmethane; 2,2-Bis(hydroxymethyl)-1,3-propanediol; Methane, tetrakis(hydroxymethyl)- |
| Formula | $C_{20}H_{14}$ | $C_5H_{12}O_4$ |
| F.W. | 254.33 | 136.15 |
| Melting Point | 252-256° C. 252-254° C. | 257-264° C. 253-258° C. |
| Boiling Point | None found | 276° C. (at 30 mmHg) 276° C./30 mmHg(lit.) |
| Vapor Pressure | None found | <1 mmHG (20° C.) |
| radius | 4.7 Angstroms | 3.3 Angstroms |
| Structure | 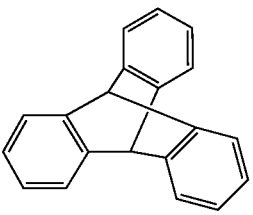 [SMILES: c1ccc2c(c1)C1c3ccccc3C2c2ccccc21] | 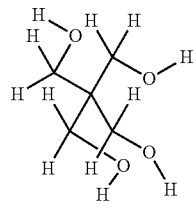 |

A 1-aminoanthraquinone [CAS #82-45-1] pellet is also examined for its behavior in a C5 epoxy sealing system. The 1-aminoanthraquinone has a melting point in the same range not monitored during advanced curing, but the specimens are still identified by their B-stage humidity level for labeling purposes.

From the surface area data, both cured epoxy seal samples have very low surface areas (approximately 0.09 m²/g), and the shapes of the adsorption plots indicate a very nonporous structure. By dividing the volume of the pores by their area and multiplying by 4, the average pore width is determined. Two different techniques are employed for pore width determination—the BET value and the BJH value. For both techniques, the C5 epoxy sample cured at 35% humidity showed a larger pore width than the C5 epoxy cured with 0% humidity (25.53 as opposed to 0.312 nm with BET, 39.53 as opposed to 27.16 nm with BJH). The inclusion of water during the B-stage curing appears to provide a larger pore structure in the cured epoxy-based polymer. Based on the BET pore widths, a smaller pore width, for example, given by curing in 0% humidity, provides the ability to greatly enhance retention of the larger triptycene molecule.

The identification and characterization of the starting material chemistry for the epoxy-based system is included herein, as are the properties of the cured epoxy-based system. For the C5 epoxy, Part A epoxy resin has the six components listed above, including the two proprietary epoxy resins and a proprietary elastomeric polymer; Part B has a single a proprietary imidazole hardener, and Part C is an optional component for colorant and includes nine components, including three proprietary epoxy resins and a proprietary elastomer. Analysis of the materials indicates that the hardener of Part B is 2-ethyl-4-methyl-1H-imidazole. Of the six components listed for the Part A precursor, the silica and titanium dioxide are believed to be relatively inert and do not play a significant role in the cured epoxy chemistry. The neopentyl glycol diglycidyl ether (CAS #17557-23-2) of Part A has two epoxide groups, so it does not reduce the crosslink density and is believed to provide structural flexibility in between the larger, more rigid aromatic epoxy resins. This increased mobility allows the material to desirably flow and increases the pot life. The two proprietary epoxy resins are major constituents of the Part A precursor. The elastomeric polymer is not believed to react with the epoxies during curing, although unsaturated double bonds may participate in some cross-linking. Generally, where the elastomeric polymer does not react, it forms a separate phase within the epoxy which provides more impact resistance and increased mobility. While not limiting the present disclosure to any particular theory, it is likely this elastomeric polymer and the inclusion of the neopentyl glycol diglycidyl ether in the backbone of the epoxy are imparting the high temperature reflow capability of the C5 system. The two remaining Part A epoxy resin precursors are determined to be derivatives of the diglycidyl ether of Bisphenol A.

In the manner, the present teachings provide high-temperature thermal cutoff devices and methods of making such devices, by forming high-temperature stable seals and high temperature thermal pellets comprising one or more organic compounds that are substantially retained by the seal barrier. The HTTCOs are highly stable, robust, and are capable of use as switching devices in a variety of high-temperature applications that were previously not possible, such as high-temperature clothing and hair styling irons.

What is claimed is:

1. A high temperature thermally-actuated thermal cutoff device comprising:
    a housing;
    a high-temperature thermal pellet comprising an organic polycyclic aromatic hydrocarbon compound selected from the group consisting of triptycene, aminoanthraquinone, and combinations thereof that is present at greater than or equal to about 96% by weight of the pellet, wherein the high-temperature thermal pellet is disposed in the housing and maintains its structural rigidity up to a transition temperature of greater than or equal to about 240° C.; and
    a high-temperature seal comprising a cured high-temperature epoxy resin formed from at least two precursors including a first precursor comprising bisphenol A and a second precursor comprising a hardener that are cured to create a barrier that interacts with the high-temperature thermal pellet to substantially prevent escape of the organic polycyclic aromatic hydrocarbon compound from the housing into an external environment up to the transition temperature.

2. The high temperature thermally-actuated thermal cutoff device of claim 1, wherein the organic polycyclic aromatic hydrocarbon compound comprises 1-aminoanthraquinone.

3. The high temperature thermally-actuated thermal cutoff device of claim 1, wherein the organic polycyclic aromatic hydrocarbon compound consists essentially of 1-aminoanthraquinone.

4. The high temperature thermally-actuated thermal cutoff device of claim 1, wherein the device is capable of operating at greater than or equal to about 1,000 hours at a sustained temperature of about 235° C.

5. The high temperature thermally-actuated thermal cutoff device of claim 4, wherein the epoxy resin is formed from a diglycidyl ether bisphenol A resin and a hardener comprising a modified imidazole compound.

6. The high temperature thermally-actuated thermal cutoff device of claim 5, wherein the hardener comprises 2-ethyl-4-methyl-1H-imidazole.

7. The high temperature thermally-actuated thermal cutoff device of claim 1, wherein the high-temperature seal is formed by combining the first precursor that comprises bisphenol A diglycidyl ether and the second precursor that comprises 2-ethyl-4-methyl-1H-imidazole.

8. The high temperature thermally-actuated thermal cutoff device of claim 1, wherein the high-temperature seal is formed by combining at least three precursors, wherein the first precursor comprises a bisphenol A diglycidyl ether polymer; the second precursor comprises 1-(2-cyanoethyl)-2-ethyl-4-methyl imidazole; and the third precursor comprises benzenetetracarboxylic-1,2,4,5-dianhydride, hexahydrophthalic anhydride, and phthalic anhydride.

9. The high temperature thermally-actuated thermal cutoff device of claim 1, wherein the high-temperature thermal pellet further comprises one or more components selected from the group consisting of: a binder, a press aid, a release agent, a pigment, and combinations thereof.

10. The high temperature thermally-actuated thermal cutoff device of claim 1, wherein the high-temperature thermal pellet consists essentially of the organic polycyclic aromatic hydrocarbon compound and one or more components cumulatively present at greater than 0% to less than or equal to about 4% by weight of a total weight of the high-temperature thermal pellet, wherein the one or more components are selected from the group consisting of: binders, lubricants, press-aids, pigments, and combinations thereof.

11. A method of making a high-temperature thermally-actuated, current cutoff device, comprising:
    preparing a high-temperature pellet composition comprising a single organic crystalline compound selected from triptycene or aminoanthraquinone and present at greater than or equal to about 96% by weight of the pellet to form a high-temperature thermal pellet that maintains its structural rigidity up to a transition temperature of about 240° C.;

disposing the high-temperature thermal pellet into the thermally-actuated, current cutoff device;

combining at least two distinct curable polymeric precursors for forming a cured high-temperature epoxy resin, wherein the at least two distinct curable polymeric precursors comprise a first precursor comprising bisphenol A and a second precursor comprising a hardener;

applying the at least two distinct curable polymeric precursors to one or more openings of the thermally-actuated, current cutoff device; and curing the at least two distinct curable polymeric precursors to form a high-temperature seal comprising the cured high-temperature epoxy resin that creates a barrier that interacts with the high-temperature pellet composition to substantially prevent escape of the high-temperature pellet composition into an external environment up to the transition temperature.

12. The method of claim 11, wherein the first precursor comprises a diglycidyl ether bisphenol A resin and the second precursor is a hardener comprising a modified imidazole compound.

13. The method of claim 12, wherein the first precursor further comprises a component selected from the group consisting of: an elastomer, neopentyl glycol diglycidyl ether, and combinations thereof; and the second precursor comprises 2-ethyl-4-methyl-1H-imidazole.

14. The method of claim 11, wherein the high-temperature seal is formed by combining at least three precursors, wherein the first precursor comprises a bisphenol A diglycidyl ether polymer; the second precursor comprises 1-(2-cyanoethyl)-2-ethyl-4-methyl imidazole; and a third precursor comprises benzenetetracarboxylic-1,2,4,5-dianhydride, hexahydrophthalic anhydride, and phthalic anhydride.

15. A high temperature thermally-actuated thermal cutoff device comprising:

a housing;

a high-temperature thermal pellet comprising 1-aminoanthraquinone, wherein the high-temperature thermal pellet is disposed in the housing and maintains its structural rigidity up to a transition temperature of greater than or equal to about 240° C.; and a high-temperature epoxy seal that creates a barrier that interacts with the high-temperature thermal pellet to substantially prevent escape of the 1-aminoanthraquinone from the housing into an external environment up to the transition temperature, wherein the high-temperature epoxy seal is formed by combining at least two precursors, wherein a first precursor is selected from the group consisting of: bisphenol A diglycidyl ether, an elastomer, neopentyl glycol diglycidyl ether, and combinations thereof; and a second precursor comprises a modified imidazole compound.

16. The high temperature thermally-actuated thermal cutoff device of claim 15, wherein the first precursor comprises a diglycidyl ether bisphenol A resin and the second precursor comprises 2-ethyl-4-methyl-1H-imidazole.

17. The high temperature thermally-actuated thermal cutoff device of claim 15, wherein the high-temperature seal is formed by combining at least three precursors, wherein a first precursor comprises a bisphenol A diglycidyl ether polymer; a second precursor comprises 1-(2-cyanoethyl)-2-ethyl-4-methyl imidazole; and a third precursor comprises benzenetetracarboxylic-1,2,4,5-dianhydride, hexahydrophthalic anhydride, and phthalic anhydride.

* * * * *